US008588683B2

(12) United States Patent
 Kamata

(10) Patent No.: US 8,588,683 B2
(45) Date of Patent: Nov. 19, 2013

(54) ELECTRONIC CIRCUIT, SEMICONDUCTOR DEVICE, AND ELECTRONIC DEVICE

(75) Inventor: Koichiro Kamata, Kanagawa (JP)

(73) Assignee: Semiconductor Energy Laboratory Co., Ltd., Kanagawa-ken (JP)

(*) Notice: Subject to any disclaimer, the term of this patent is extended or adjusted under 35 U.S.C. 154(b) by 182 days.

(21) Appl. No.: 13/297,302

(22) Filed: Nov. 16, 2011

(65) Prior Publication Data

US 2012/0126863 A1    May 24, 2012

(30) Foreign Application Priority Data

Nov. 19, 2010  (JP) ................................. 2010-258446

(51) Int. Cl.
 *H04B 5/00* (2006.01)
(52) U.S. Cl.
 USPC ........... 455/41.1; 455/334; 455/337; 340/5.1; 340/10.1; 340/10.31; 340/13.24; 340/13.26; 327/18; 327/19; 327/20; 327/97
(58) Field of Classification Search
 USPC ........ 455/41.1, 410, 411, 572, 334, 336, 337; 340/5.1, 5.2, 5.3, 5.31, 10.1, 10.31, 340/540, 541, 542, 546, 547, 13.24, 13.26; 327/18, 19, 20, 22, 23, 97
 See application file for complete search history.

(56) References Cited

U.S. PATENT DOCUMENTS

| 4,602,253 | A | * | 7/1986 | Kreft | .............................. | 340/5.63 |
| 4,611,127 | A | * | 9/1986 | Ibrahim et al. | ................. | 307/116 |
| 5,376,932 | A | * | 12/1994 | Samokine et al. | ........... | 340/5.61 |
| 5,491,715 | A | * | 2/1996 | Flaxl | .............................. | 375/344 |
| 5,701,121 | A | * | 12/1997 | Murdoch | .................... | 340/10.34 |
| 6,307,468 | B1 | * | 10/2001 | Ward, Jr. | ........................ | 340/505 |
| 6,329,808 | B1 | * | 12/2001 | Enguent | ...................... | 324/76.77 |
| 6,398,116 | B1 | * | 6/2002 | Kreft | .............................. | 235/492 |

(Continued)

FOREIGN PATENT DOCUMENTS

| JP | 2005-228981 | 8/2005 |
| JP | 2005-348264 | 12/2005 |
| JP | 2006-050354 | 2/2006 |
| JP | 2006-105630 | 4/2006 |

OTHER PUBLICATIONS

Kawai, et al., "A 2.5Gb/s/ch 4PAM Inductive-Coupling Transceiver for Non-Contact Memory Card", ISSCC 2010(Digest of Technical Papers, IEEE International Solid-State Circuits Conference), Feb. 9, 2010, pp. 264-265.

*Primary Examiner* — Tuan A Tran
(74) *Attorney, Agent, or Firm* — Nixon Peabody LLP; Jeffrey L. Costellia

(57) ABSTRACT

The electronic circuit includes a first comparator and a second comparator in which an induced electromotive force of a coil are compared with each of a first reference potential and a second reference potential and which output a pulse signal in accordance with conditions; the first signal processing circuit which outputs a first receiving rectangular wave signal and a first error signal in accordance with conditions of the pulse signal output from the first comparator and in which data held in accordance with conditions of pulse signal output from the second comparator is reset; and the second signal processing circuit which outputs a second receiving rectangular wave signal and a second error signal in accordance with conditions of the pulse signal output from the second comparator and in which data held in accordance with conditions of pulse signal output from the first comparator is reset.

24 Claims, 13 Drawing Sheets

(56) References Cited

U.S. PATENT DOCUMENTS

| | | | |
|---|---|---|---|
| 7,145,451 B2 * | 12/2006 | Ward, Jr. ..................... 340/506 |
| 7,330,708 B2 * | 2/2008 | Umewaka et al. ......... 455/193.1 |
| 7,385,655 B2 | 6/2008 | Imai et al. |
| 7,768,790 B2 | 8/2010 | Kuroda et al. |
| 7,769,253 B2 | 8/2010 | Imai et al. |
| 2008/0074236 A1 * | 3/2008 | Rebholz-Goldmann .... 340/5.72 |
| 2008/0258744 A1 | 10/2008 | Kuroda et al. |
| 2008/0266061 A1 * | 10/2008 | Stiglic et al. ................. 340/10.5 |
| 2009/0057039 A1 | 3/2009 | Kuroda et al. |

* cited by examiner

ELECTRONIC CIRCUIT, SEMICONDUCTOR DEVICE, AND ELECTRONIC DEVICE

BACKGROUND OF THE INVENTION

1. Field of the Invention

The present invention disclosed in this specification relates to an electronic circuit, a semiconductor device, and an electronic device.

2. Description of the Related Art

In recent years, large scale integration (LSI) chips incorporated into electronic devices such as mobile phones and laptops are required to have a smaller size and a higher data transmission rate. It is suggested to use an electronic circuit which performs wireless communication with the use of a combination of a coil and a semiconductor element such as an LSI chip, utilizing electromagnetic induction, in order to achieve a smaller size and a higher data transmission rate (Patent Document 1). For example, an LSI chip or an electronic device can intercommunicate with an LSI chip. It is expected that the technique is applied to a stacking technique of LSI chips, IC chips, and the like.

In a conventional technique, IC chips have transmitted/received a signal to/from each other through wires which are provided by wire bonding or the like. Further, in recent years, a technique is proposed in which a communication path (referred to as a through hole) penetrating an IC chip is formed. However, the above techniques need an advanced wiring connection step, resulting in high cost; therefore, there is a physical limit on manufacturing stacked IC chips.

On the other hand, stacked IC chips which wirelessly transmit/receive a signal to/from each other have advantages as follows: the yield of the stacked IC chips cannot be lower than the yield of each of the IC chips and integration circuit can be enlarged smoothly without complicated steps (Non Patent Document 1).

The configuration and operation of a conventional receiving circuit which is used for such wireless communication is described with reference to FIG. 11 and FIGS. 12A to 12C. FIG. 11 is a circuit diagram showing an example of the configuration of the conventional receiving circuit and part of a transmitting circuit. FIGS. 12A to 12C are examples of timing diagrams at the time of transmission/reception of signals.

A transmitting circuit 10 includes a coil 11. One of terminals of the coil 11 is connected to a ground potential line. A transmitting rectangular wave signal (TXDATA) is input to the other of the terminals of the coil 11. On the other hand, a receiving circuit 20 includes a coil 21, a first comparator 23a, a second comparator 23b, and a latch circuit 25 including a NAND circuit element. One of terminals of the coil 21 is connected to the ground potential line. The other of the terminals of the coil 21 is connected to an inversion input terminal (hereinafter, also referred to as a − terminal) of the first comparator 23a and a non-inversion input terminal (hereinafter, also referred to as a + terminal) of the second comparator 23b. A first reference voltage (VH) and a second reference voltage (VL) are input to a + terminal of the first comparator 23a and a − terminal of the second comparator 23b, respectively. A voltage higher than 0 V and a voltage lower than 0 V are used for the first reference voltage (VH) and the second reference voltage (VL), respectively. An output terminal of the first comparator 23a and an output terminal of the second comparator 23b are each connected to the latch circuit 25. A first receiving rectangular wave signal (RXDATA) is output from the latch circuit 25. Further, at the same time, a second receiving rectangular wave signal (/RXDATA), which is an inverted output signal of the first receiving rectangular wave signal (RXDATA), is output from the latch circuit 25.

Here, in order to show a positional relation between the coil 11 of the transmitting circuit 10 and the coil 21 of the receiving circuit 20, a black dot is written beside one of terminals of each coil illustrated in FIG. 11. Specifically, in the case of positive coupling coefficient, the direction of current which flows through the coil 11 and the direction of current which flows through the coil 21 are the same with respect to each one of the terminals beside which the black dot is written. Note that coupling coefficient between the coils is positive.

Next, a receiving operation is described with reference to timing diagrams of FIGS. 12A to 12C in addition to FIG. 11. FIG. 12A, FIG. 12B, and FIG. 12C show changes over time in voltages of the transmitting rectangular wave signal (TXDATA), a potential difference (an induced electromotive force VR) between both ends of the coil 21, and the first receiving rectangular signal (RXDATA), respectively. Here, the induced electromotive force (VR) is equal to a voltage input to a − terminal of the first comparator 23a and a + terminal of the second comparator 23b. In the coil 21 shown in FIG. 11, the side beside which the black dot is written is a positive side and the side beside which no black dot is written is a negative side.

When the transmitting rectangular wave signal (TXDATA) changes between a High-level voltage and the Low-level voltage, the induced electromotive force (VR) is generated in the coil 21 by electromagnetic induction; accordingly, a pulsed voltage waveform as shown in FIG. 12B is obtained. When the induced electromotive force (VR) becomes higher than the first reference voltage (VH) input to the first comparator 23a, the High-level voltage is output as the first receiving rectangular wave signal (RXDATA) which is the output voltage of the latch circuit 25. On the other hand, when the induced electromotive force (VR) becomes lower than the second reference voltage (VL) input to the second comparator 23b, the first receiving rectangular wave signal (RXDATA) is inverted and then the Low-level voltage is output. The latch circuit 25 holds the output voltage until the voltage of the transmitting rectangular wave signal (TXDATA) changes.

With the above-described configuration and by the above-described driving method, the receiving circuit 20 receives the transmitting rectangular wave signal (TXDATA) from the transmitting circuit 10 and can restore the transmitting rectangular wave signal (TXDATA) as the first receiving rectangular wave signal (RXDATA).

REFERENCE

[Patent Document 1] Japanese Published Patent Application No. 2005-228981

[Non-Patent Document 1] Shunsuke Kawai, Hiroki Ishikuro, Tadahiro Kuroda, "A 2.5 Gb/s/ch 4PAM Inductive-Coupling Transceiver for Non-Contact Memory Card", ISSCC2010/SESSION14/NON-VOLATILE MEMORY/14.5, 9 Feb. 2010, pp. 264-265

SUMMARY OF THE INVENTION

The wireless communications with such IC chips are assumed to be performed at the same time by providing of a plurality of pairs of coils. Further, at that time, a clock synchronization circuit which generates a signal alternately going to a high level and a low level at a constant cycle repeatedly is needed in order to transmit and receive a signal. However, in this case, a plurality of signals are wirelessly transmitted and received by IC chips; therefore, there is a possibility that a signal is not properly transmitted and received by effect of noise and false recognition of an unintentional signal from stacked IC chips.

FIGS. 13A to 13C show timing diagrams showing the case where noise overlaps with the induced electromotive force (VR) and a transmitted signal is wrong. FIG. 13A, FIG. 13B, and FIG. 13C show changes over time in voltages of the transmitting rectangular wave signal (TXDATA), a potential difference (the induced electromotive force VR) between both ends of the coil 21, and the first receiving rectangular wave signal (RXDATA), respectively.

Since the voltage of "NOISE 1" in FIG. 13B is lower than the second reference voltage (VL), the first receiving rectangular wave signal (RXDATA) becomes the Low-level voltage at wrong timing due to the noise. The voltage of "NOISE 2" is generated so as to cancel the original falling pulse of the induced electromotive force (VR); as a result, a falling pulse of the induced electromotive force (VR) is not detected and the first receiving rectangular wave signal (RXDATA) maintains the High-level voltage (see FIG. 13C).

It is an object of an embodiment of the present invention to provide an electronic circuit detecting effect of noise and an unnecessary signal from IC chips which are stacked or are adjacent to each other as an error. Further, it is an object to provide a semiconductor device including the electronic circuit.

An embodiment of the present invention is an electronic circuit including a second coil configured to receive a transmitting signal which a first coil outputs, by utilizing electromagnetic induction; a first comparator which compares induced electromotive force of the second coil with a first reference potential and outputs a pulse signal in the case where the induced electromotive force of the second coil is higher than the first reference potential; a second comparator which compares the induced electromotive force of the second coil with a second reference potential and outputs a pulse signal in the case where the induced electromotive force of the second coil is lower than the second reference potential; a first signal processing circuit which outputs a first receiving rectangular wave signal when the pulse signal is output from the first comparator, which outputs a first error signal when the pulse signal is output twice or more in succession from the first comparator, and in which data held when the pulse signal is output from the second comparator is reset; and a second signal processing circuit which outputs a second receiving rectangular wave signal when the pulse signal is output from the second comparator, which outputs a second error signal when the pulse signal is output twice or more in succession from the second comparator, and in which data held when the pulse signal is output from the first comparator is reset.

Another embodiment of the present invention is an electronic circuit including a second coil configured to receive a transmitting signal which a first coil outputs, by utilizing electromagnetic induction; a first comparator which compares induced electromotive force of the second coil with a first reference potential and outputs a pulse signal in the case where the induced electromotive force of the second coil is higher than the first reference potential; a second comparator which compares the induced electromotive force of the second coil with a voltage of a second reference potential and outputs a pulse signal in the case where the induced electromotive force of the second coil is lower than the second reference potential; a first signal processing circuit which outputs a first receiving rectangular wave signal when the pulse signal is output from the first comparator, which outputs a first error signal when the pulse signal is output twice or more in succession from the first comparator, and in which data held when the pulse signal is output from the second comparator is reset; and a second signal processing circuit which outputs a second receiving rectangular wave signal when the pulse signal is output from the second comparator, which outputs a second error signal when the pulse signal is output twice or more in succession from the second comparator, and in which data held when the pulse signal is output from the first comparator is reset. The first signal processing circuit includes a first D-type flip-flop and a second D-type flip-flop. The first D-type flip-flop and the second D-type flip-flop each have a clock terminal, an output terminal, an inverted output terminal, a data input terminal, and a reset terminal. The second signal processing circuit includes a third D-type flip-flop and a fourth D-type flip-flop. The third D-type flip-flop and the fourth D-type flip-flop each have a clock terminal, an output terminal, an inverted output terminal, a data input terminal, and a reset terminal. The pulse signal output from the first comparator is input to the clock terminal of the first D-type flip-flop, the reset terminal of the third D-type flip-flop, and the reset terminal of the fourth D-type flip-flop. An inverted output signal of the first receiving rectangular wave signal output from the output terminal of the first D-type flip-flop is input to the data input terminal of the first D-type flip-flop and the clock terminal of the second D-type flip-flop. An inverted output signal of the first error signal output from the output terminal of the second D-type flip-flop is input to the data input terminal of the second D-type flip-flop. The pulse signal output from the second comparator is input to the clock terminal of the third D-type flip-flop, the reset terminal of the first D-type flip-flop, and the reset terminal of the second D-type flip-flop. An inverted output signal of the second receiving rectangular wave signal output from the output terminal of the third D-type flip-flop is input to the data input terminal of the third D-type flip-flop and the clock terminal of the fourth D-type flip-flop. An inverted output signal of the second error signal output from the output terminal of the fourth D-type flip-flop is input to the data input terminal of the fourth D-type flip-flop.

Another embodiment of the present invention is an electronic circuit including a second coil configured to receive a transmitting signal which a first coil outputs, by utilizing electromagnetic induction; a first comparator which compares induced electromotive force of the second coil with a first reference potential and outputs a pulse signal in the case where the induced electromotive force of the second coil is higher than the first reference potential; a second comparator which compares the induced electromotive force of the second coil with a second reference potential and outputs a pulse signal in the case where the induced electromotive force of the second coil is lower than the second reference potential; a first signal processing circuit which outputs a first receiving rectangular wave signal when the pulse signal is output from the first comparator and a first error signal when the pulse signal is output twice or more in succession from the first comparator, and in which data held when the pulse signal is output from the second comparator is reset; and a second signal processing circuit which outputs a second receiving rectangular wave signal when the pulse signal is output from the second comparator, which outputs a second error signal when the pulse signal is output twice or more in succession from the second comparator, and in which data held when the pulse signal is output from the first comparator is reset; a first inverter circuit between the second comparator and the first signal processing circuit; and a second inverter circuit between the first comparator and the second signal processing circuit. The first signal processing circuit includes a first T-type flip-flop and a second T-type flip-flop. The first T-type flip-flop and the second T-type flip-flop each have a count input terminal, an output terminal, an inverted output terminal, and an inversion reset terminal. The pulse signal output from the first comparator is input to the count input terminal of the first T-type flip-flop and the second inverter circuit. The first receiving rectangular wave signal output from the output terminal of the first T-type flip-flop is input to the count input terminal of the second T-type flip-flop. The second signal processing circuit includes a third T-type flip-flop and a fourth T-type flip-flop. The third T-type flip-flop and the fourth T-type flip-flop each have a count input terminal, an output terminal, an inverted output terminal, and an inversion reset terminal. The pulse signal output from the second comparator is input to the count input terminal of the third T-type flip-flop and the first inverter circuit, and the second receiving rectangular wave signal output from the output terminal of the third T-type flip-flop is input to the count input terminal of the fourth T-type flip-flop.

Another embodiment of the present invention is a semiconductor device including at least an IC chip configured to transmit a signal and an IC chip configured to receive a signal, which are stacked together or are adjacent to each other. The IC chip configured to transmit a signal includes a transmitting circuit provided with a first coil. The IC chip configured to receive a signal includes a receiving circuit.

Another embodiment of the present invention may be an electronic device including the semiconductor device.

According to an embodiment of the present invention, a circuit for controlling transmission and reception of a signal can transmit and receive the signal stably by transmission and reception of the signal again at the time of detection of an error signal; therefore, a highly reliable electronic circuit can be provided. Further, a highly reliable semiconductor device can be provided by using the electronic circuit.

DETAILED DESCRIPTION OF THE INVENTION

Figure 1:
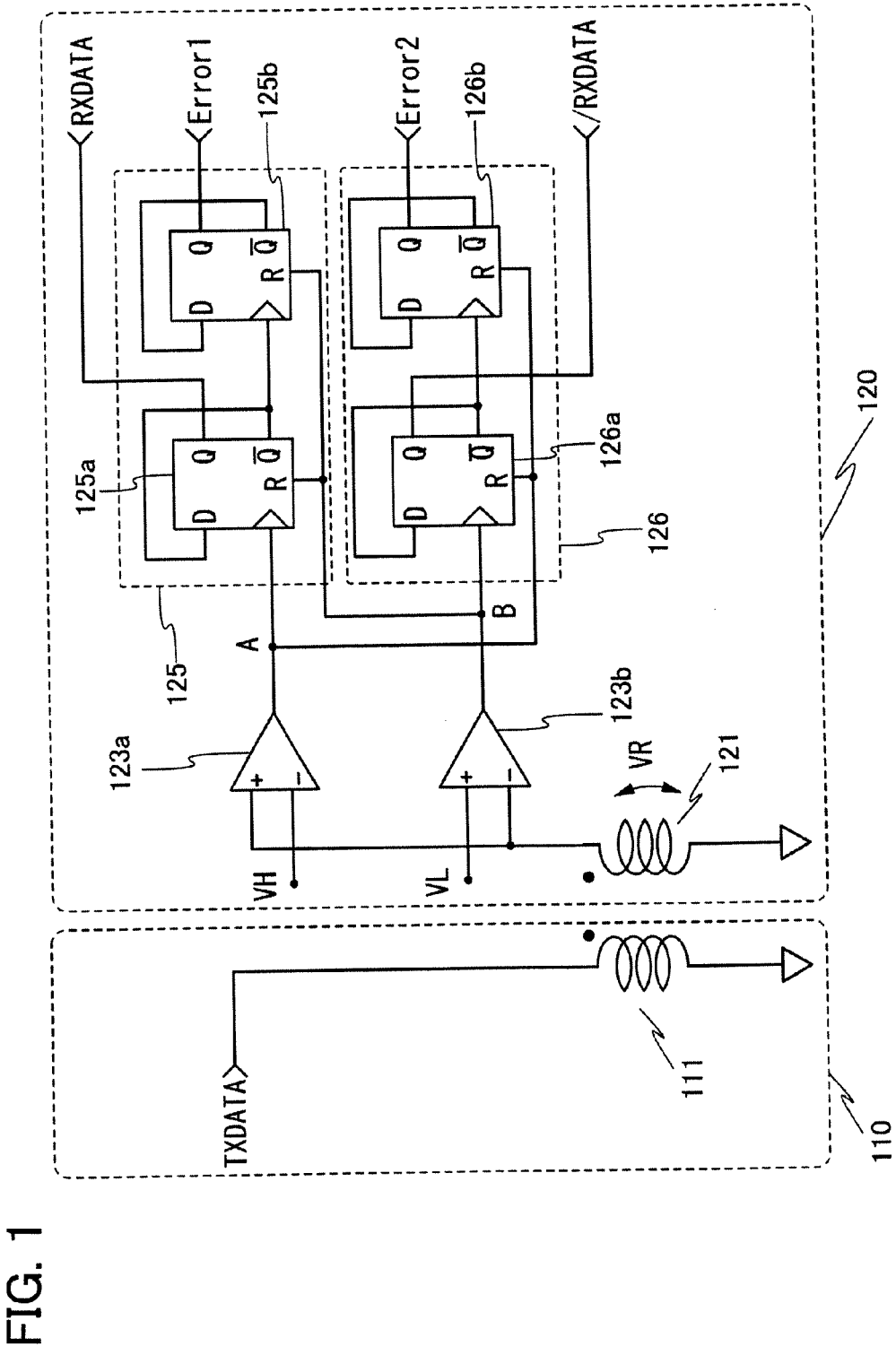
FIG. 1 is a diagram illustrating a receiving circuit of an embodiment of the present invention.

Hereinafter, embodiments of the present invention will be described with reference to the drawings. Note that the present invention is not limited to the following description and it will be readily appreciated by those skilled in the art that modes and details can be modified in various ways without departing from the spirit and the scope of the present invention. Therefore, the invention should not be construed as being limited to the description in the following embodiments.

Note that the position, the size, the range, or the like of each structure illustrated in drawings is not accurately represented in some cases for easy understanding. Therefore, the present invention is not limited to the position, size, range, and the like disclosed in the drawings.

In this specification and the like, ordinal numbers such as "first", "second", and "third" are used in order to avoid confusion among components, and the terms do not limit the components numerically.

Embodiment 1

In this embodiment, a receiving circuit of an embodiment of the present invention is described with reference to FIG. 1, FIGS. 2A to 2E, FIGS. 3A to 3G, and FIGS. 4A to 4F.

<Example of Circuit Configuration>

First, circuit configurations of a transmitting circuit 110 and a receiving circuit 120 which are described in this embodiment are explained with reference to FIG. 1. FIG. 1 illustrates part of the configuration of the transmitting circuit and an example of the configuration of the receiving circuit in which a D-type flip-flop (hereinafter referred to as a Delayed-Flip-Flop (D-FF)) is used for a first signal processing circuit shown in this embodiment and a second signal processing circuit shown in this embodiment.

The transmitting circuit 110 transmits the transmitting rectangular wave signal (TXDATA) with the use of a coil. The transmitting circuit 110 of this embodiment includes a coil 111. One of terminals of the coil 111 is connected to a ground potential line. The transmitting rectangular wave signal (TXDATA) is input to the other of the terminals of the coil 111. Note that in this embodiment, one of the terminals of the coil 111 is grounded but an embodiment of the present invention is not limited to the configuration. The one of the terminals of the coil 111 may be connected to the other function element, circuit, or the like. An embodiment of the present invention is not limited to the configuration and the following configuration can be employed: change in current flowing through the coil can be detected by the transmitting rectangular wave signal (TXDATA).

The receiving circuit 120 according to an embodiment of the present invention includes a coil 121, a first comparator 123a, a second comparator 123b, a first signal processing circuit 125, and a second signal processing circuit 126. The first signal processing circuit 125 includes a first D-FF 125a and a second D-FF 125b. The second signal processing circuit 126 includes a third D-FF 126a and a fourth D-FF 126b.

A potential difference (induced electromotive force VR) generates between both ends of the coil 121 by electromagnetic induction in accordance with a signal output from the coil 111 of the transmitting circuit 110. In this embodiment, one of terminals of the coil 121 is connected to the ground potential line and the other of the terminals of the coil 121 is connected to a + terminal of the first comparator 123a and a − terminal of the second comparator 123b.

Here, in order to show a position relation between the coil 111 and the coil 121, a black dot is written beside one of terminals of each coil illustrated in FIG. 1. Specifically, in the case of positive coupling coefficient, the direction of current which flows through the coil 111 and the direction of current which flows through the coil 121 are the same with respect to each one of the terminals beside which the black dot is written. Note that in this embodiment, coupling coefficient between the coils is positive.

In the following description of this embodiment, in the receiving circuit 120 in FIG. 1, a node formed by the connection of the first comparator 123a, a clock terminal of the first D-FF 125a, a reset terminal of the third D-FF 126a, and a reset terminal of the fourth D-FF 126b is a node A. The clock terminal of the first D-FF 125a, the reset terminal of the third D-FF 126a, and the reset terminal of the fourth D-FF 126b are described later. A node formed by the connection of the second comparator 123b, a clock terminal of the third D-FF 126a, a reset terminal of the first D-FF 125a, and a reset terminal of the second D-FF 125b is a node B. The clock terminal of the third D-FF 126a, the reset terminal of the first D-FF 125a, and the reset terminal of the second D-FF 125b are described later.

The first comparator 123a compares the induced electromotive force (VR) generated from the coil 121 and the first reference voltage (VH), and outputs a signal based on the result of the comparison to the node A. A voltage higher than 0 V is used as the first reference voltage (VH). In this embodiment, the induced electromotive force (VR) is input to the + terminal of the first comparator 123a and the first reference voltage (VH) is input to a − terminal of the first comparator 123a. The first comparator 123a is not limited to this configuration and can have any configuration as long as the above-described purpose can be achieved.

The second comparator 123b compares the induced electromotive force (VR) generated from the coil 121 and the second reference voltage (VL), and outputs a signal based on the result of the comparison to the node B. A voltage lower than 0 V is used as the second reference voltage (VL). In this embodiment, the second reference voltage (VL) is input to a + terminal of the second comparator 123b and the induced electromotive force (VR) is input to the − terminal of the second comparator 123b. The second comparator 123b is not limited to this configuration and can have any configuration as long as the above-described purpose can be achieved.

The first D-FF 125a, the second D-FF 125b, the third D-FF 126a, and the fourth D-FF 126b each include a clock terminal (>), a data input terminal (D), a reset terminal (R), an output terminal (Q), and an inverted output terminal (/Q).

The first receiving rectangular wave signal (RXDATA) is output from the output terminal (Q) of the first D-FF 125a. A first error signal (Error 1) is output from the output terminal (Q) of the second D-FF 125b. The second receiving rectangular wave signal (/RXDATA) is output from the output terminal (Q) of the third D-FF 126a. A second error signal (Error 2) is output from the output terminal (Q) of the fourth D-FF 126b.

A purpose of an embodiment of the present invention is detection of error signals and therefore kinds of error signals are not necessarily distinguished. However, in this embodiment, error signals are distinguished between the first error signal (Error 1) and the second error signal (Error 2) in order to avoid confusion among components.

An inverted output signal of the first receiving rectangular wave signal (RXDATA) is input to the data input terminal of the first D-FF 125a and the clock terminal of the second D-FF 125b. An inverted output signal of the first error signal (Error 1) is input to the data input terminal of the second D-FF 125b. An inverted output signal of the second receiving rectangular wave signal (/RXDATA) is input to the data input terminal of the third D-FF 126a and the clock terminal of the fourth D-FF 126b. An inverted output signal of the second error signal (Error 2) is input to the data input terminal of the fourth D-FF 126b. An output of the first comparator 123a is input to the clock terminal of the first D-FF 125a, the reset terminal of the third D-FF 126a, and the reset terminal of the fourth D-FF 126b. An output of the second comparator 123b is input to the clock terminal of the third D-FF 126a, the reset terminal of the first D-FF 125a, and the reset terminal of the second D-FF 125b.

<Example of Circuit Operation>

Next, a circuit operation at the time of receiving a signal is described with reference to FIGS. 2A to 2E in addition to FIG. 1. FIGS. 2A to 2E are an example of timing diagrams at the time of transmission and reception of a signal. FIG. 2A, FIG. 2B, FIG. 2C, FIG. 2D, and FIG. 2E illustrate changes over time in voltages of the transmitting rectangular wave signal (TXDATA) input to the coil 111 of the transmitting circuit 110, the induced electromotive force (VR), a pulsed signal of the node A in FIG. 2B, a pulsed signal of the node B in FIG. 2B, and the first receiving rectangular wave signal (RXDATA), respectively.

Firstly, an initial state of each D-FF is described. Note that a D-FF is a logic circuit operating by a signal with two values (a High-level voltage and a Low-level voltage). When the clock terminal of the D-FF becomes a High level, the D-FF operates to output a signal of the data input terminal from the output terminal Initial states of the first D-FF 125a, the second D-FF 125b, and the fourth D-FF 126b are as follows: a voltage of the output terminal (Q) is the Low-level voltage and a voltage of the inverted output terminal (/Q) is the High-level voltage. An initial state of the third D-FF 126a is as follows: a voltage of the output terminal (Q) is the High-level voltage and a voltage of the inverted output terminal (/Q) is the Low-level voltage.

Further, in each D-FF, data of the data input terminal is output as data of the output terminal at the timing at which a clock signal rises; however, the timing is not limited thereto.

A period 51 shown in FIGS. 2A to 2E, in which the transmitting rectangular wave signal (TXDATA) changes from the Low-level voltage to the High-level voltage, is described. While the transmitting rectangular wave signal (TXDATA) changes to the High-level voltage, current flows through the coil 111 and a potential difference (the induced electromotive force VR) between both ends of the coil 121 is generated by electromagnetic induction.

Figure 2A:
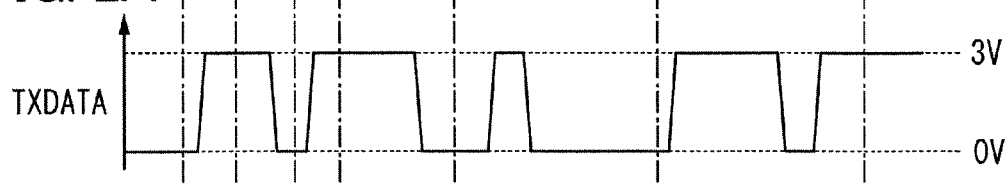
FIGS. 2A to 2E are timing diagrams explaining the receiving circuit of an embodiment of the present invention.
Figure 2B:
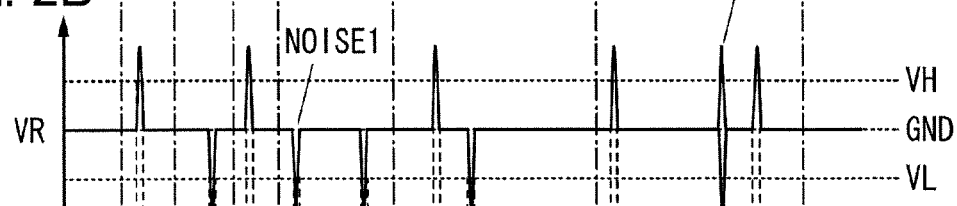

Since coupling coefficient between the coil 111 and the coil 121 is positive as described above, the induced electromotive force (VR) shows a positive pulse waveform as illustrated in FIG. 2B. In this embodiment, the Low-level voltage of the transmitting rectangular wave signal (TXDATA) is 0 V, the High-level voltage of the transmitting rectangular wave signal (TXDATA) is 3 V, and the induced electromotive force (VR) is 0 V in the initial state; however, an embodiment of the present invention is not limited thereto.

Figure 2C:
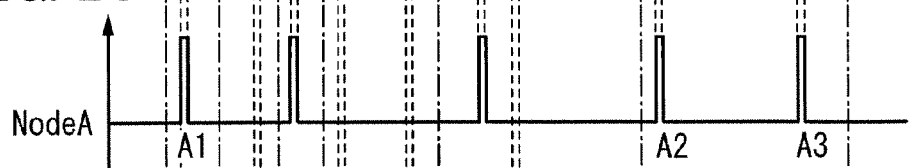

When a positive pulse is output from the coil 121 of the receiving circuit 120 as shown in A1 in FIG. 2C, the induced electromotive force (VR) and the first reference voltage (VH) are compared by the first comparator 123a and when the induced electromotive force (VR) becomes higher than the first reference voltage (VH), the voltage of the node A changes from the Low-level voltage to the High-level voltage in accordance with the change. After that, the voltage of the node A converges to the Low-level voltage.

When a pulse of the node A is input to the clock terminal of the first D-FF 125a, data of the data input terminal of the first D-FF 125a is output as the first receiving rectangular wave signal (RXDATA) at the timing at which the pulse of the node A rises. Here, in the initial state, a voltage of the data input terminal of the first D-FF 125a is the High-level voltage. That is to say, the High-level voltage (3 V) is output as the first receiving rectangular wave signal (RXDATA).

On the other hand, at the same time, the voltage of the node A (the High-level voltage) is input to the reset terminal of the third D-FF 126a and the reset terminal of the fourth D-FF 126b.

In this manner, in the initial state, data of the High-level voltage (3 V) in the second receiving rectangular wave signal (/RXDATA) is reset, the third D-FF 126a and the fourth D-FF 126b become a default state (a voltage each of the output terminals is the Low-level voltage, a voltage each of the inverted output terminals is the High-level voltage), and the Low-level voltage (0 V) is output as the second receiving rectangular wave signal (/RXDATA).

In this manner, in the period 51, when the transmitting rectangular wave signal (TXDATA) changes from the Low-level voltage (0 V) to the High-level voltage (3 V), the first receiving rectangular wave signal (RXDATA) changes from 0 V (the initial state) to 3 V (see FIG. 2E) and the second receiving rectangular wave signal (/RXDATA) changes from 3 V (the initial state) to 0 V (the default state) (not shown).

Next, a period 52 shown in FIGS. 2A to 2E in which the transmitting rectangular wave signal (TXDATA) changes from the High-level voltage to the Low-level voltage is described. While the transmitting rectangular wave signal (TXDATA) changes from the High-level voltage to the Low-level voltage, a potential difference (the induced electromotive force VR) whose direction is opposite to that in the above description is generated in the coil 121 by electromagnetic induction because coupling coefficient between the coil 111 and the coil 121 is positive as described above. That is to say, the induced electromotive force (VR) shows a negative pulse waveform.

Figure 2D:
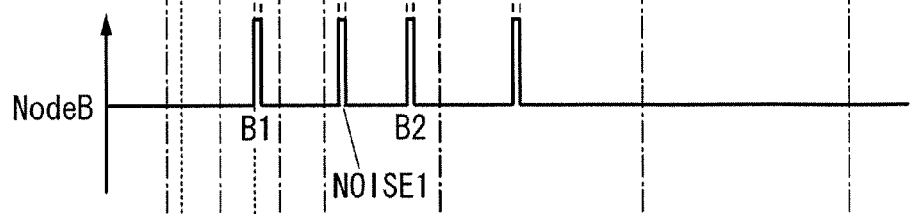
Figure 2E:
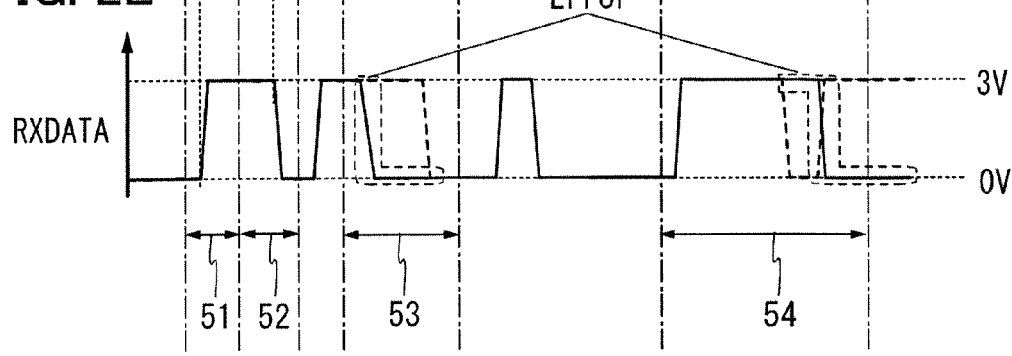

When a negative pulse is output from the coil 121 of the receiving circuit 120 as shown in B1 in FIG. 2D, similarly to the above, the induced electromotive force (VR) and the second reference voltage (VL) are compared by the second comparator 123b and when the induced electromotive force (VR) becomes lower than the second reference voltage (VL), the voltage of the node B changes from the Low-level voltage to the High-level voltage in accordance with the change. After that, the voltage of the node B converges to the Low-level voltage.

The voltage of the node B (the High-level voltage) is input to the reset terminal of the first D-FF 125a and the reset terminal of the second D-FF 125b, so that data of the High-level voltage (3 V) in the first receiving rectangular wave signal (RXDATA) in the period 51 is reset. The first D-FF 125a and the second D-FF 125b become the default state (a voltage each of the output terminals is the Low-level voltage and a voltage each of the inverted output terminals is the High-level voltage), and the Low-level voltage (0 V) is output as the first receiving rectangular wave signal (RXDATA).

On the other hand, at the same time, by a process in the period 51, the second receiving rectangular wave signal (/RXDATA) is the Low-level voltage (0 V). In addition, the data input terminal of the third D-FF 126a is the High-level voltage due to an inverted output signal of the second receiving rectangular wave signal (/RXDATA).

The pulse of the node B is input to the clock terminal of the third D-FF 126a. Data of the data input terminal of the third D-FF 126a, which is the High-level voltage, becomes the second receiving rectangular wave signal (/RXDATA) at the timing at which the pulse of the node B rises, so that the High-level voltage (3 V) is output.

In this manner, in the period 52, when the transmitting rectangular wave signal (TXDATA) changes from the High-level voltage (3 V) to the Low-level voltage (0 V), the first receiving rectangular wave signal (RXDATA) changes from 3 V (in the period 51) to 0 V (the default state) (see FIG. 2E) and the second receiving rectangular wave signal (/RXDATA) changes from 0 V to 3 V (not shown).

Thus, in the case where noise is not generated, the first receiving rectangular wave signal (RXDATA) reflects the transmitting rectangular wave signal (TXDATA), so that transmission and reception of data are performed normally. The pulse of the node A and the pulse of the node B are alternately generated; accordingly, no error signal rises because data of the third D-FF 126a and the fourth D-FF 126b is reset by the pulse of the node A.

Further, no error signal rises because data of the first D-FF 125a and the second D-FF 125b is reset by the pulse of the node B.

Then, a period 53 is described in which noise "NOISE 1" is generated during change of the transmitting rectangular wave signal (TXDATA) from the High-level voltage to the Low-level voltage.

FIGS. 3A to 3G show the period 53 shown in FIGS. 2A to 2E in detail. FIG. 3A, FIG. 3B, FIG. 3C, FIG. 3D, FIG. 3E, FIG. 3F, and FIG. 3G illustrate changes over time in voltages of the transmitting rectangular wave signal (TXDATA) output to the coil 111 of the transmitting circuit 110 in the period 53, the induced electromotive force (VR) in the period 53, the pulsed signal of the node B in the period 53, the first receiving rectangular wave signal (RXDATA) in the period 53, the second receiving rectangular wave signal (/RXDATA) in the period 53, an inverted output signal (/Q) of the second receiving rectangular wave signal (/RXDATA) in the period 53, and the second error signal (Error2) in the period 53, respectively.

Figure 3A:
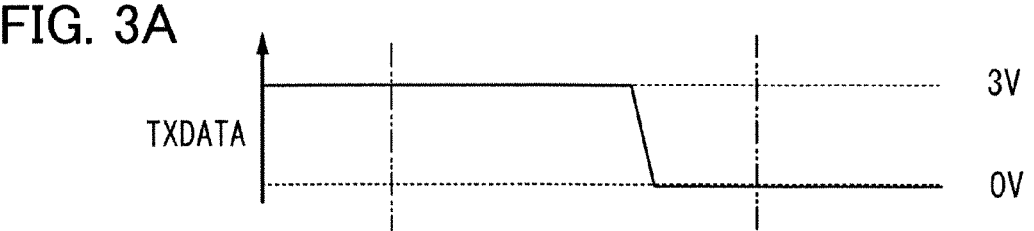
FIGS. 3A to 3G are timing diagrams explaining the receiving circuit of an embodiment of the present invention.
Figure 3B:
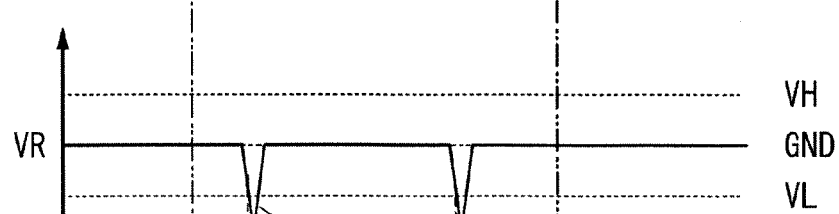
Figure 3C:
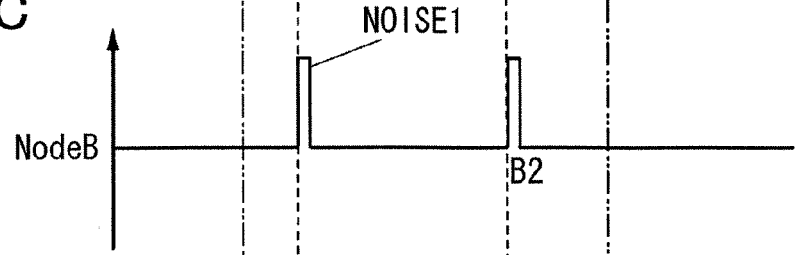
Figure 3D:
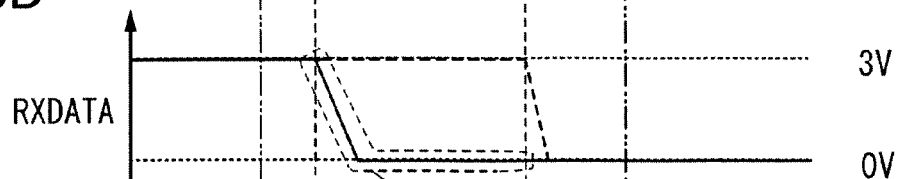

The original first receiving rectangular wave signal (RXDATA) in which the noise "NOISE 1" is not generated changes from the High-level voltage (3 V) to the Low-level voltage (0 V) as shown by a short dashed line in FIG. 3D. The first receiving rectangular wave signal (RXDATA) in which the noise "NOISE 1" is generated changes from the High-level voltage (3 V) to the Low-level voltage (0 V) as shown by a solid line in FIG. 3D, that is, a transmitted signal is wrong.

When a negative pulse is output from the coil 121 of the receiving circuit 120 as shown in the noise "NOISE 1" in FIG. 3C, the induced electromotive force (VR) and the second reference voltage (VL) are compared by the second comparator 123b and when the induced electromotive force (VR) becomes lower than the second reference voltage (VL), the voltage of the node B changes from the Low-level voltage to the High-level voltage in accordance with the change. After that, the voltage of the node B converges to the Low-level voltage.

Figure 3E:
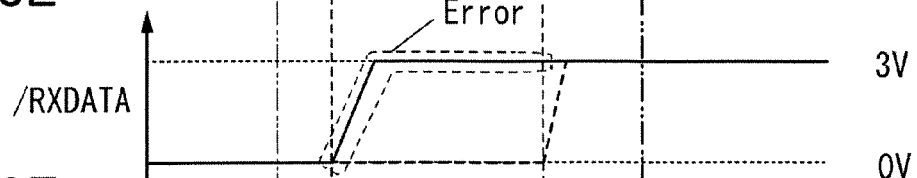

As shown in FIG. 3E, at the start of the period 53, the second receiving rectangular wave signal (/RXDATA) is the Low-level voltage (0 V). In addition, the data input terminal of the third D-FF 126a is the High-level voltage due to an inverted output signal of the second receiving rectangular wave signal (/RXDATA).

The pulse of the node B is input to the clock terminal of the third D-FF 126a due to the noise "NOISE 1". Data of the data input terminal of the third D-FF 126a, which is the High-level voltage, becomes the second receiving rectangular wave signal (/RXDATA) at the timing at which the pulse of the node B rises, so that the High-level voltage (3 V) is output.

Further, as shown in B2 in FIG. 3C, when a negative pulse is input to the coil 121 of the receiving circuit 120 at appropriate timing, the voltage of the node B changes from the Low-level voltage to the High-level voltage again by the second comparator 123b, and the pulse of the node B is input to the clock terminal of the third D-FF 126a.

Figure 3F:
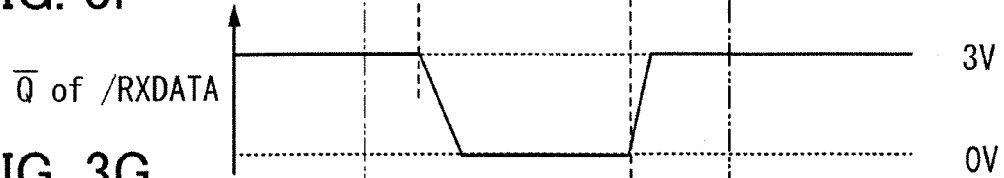

In addition, a voltage of the data input terminal of the third D-FF 126a is the Low-level voltage after the noise "NOISE 1" is generated. The second receiving rectangular wave signal (/RXDATA) changes from the High-level voltage (3 V) to the Low-level voltage (0 V) at the timing at which the pulse rises. At the same time, as shown in FIG. 3F, the inverted output signal of the second receiving rectangular wave signal (/RX-DATA) changes from the Low-level voltage (0 V) to the High-level voltage (3 V).

The fourth D-FF 126b is in the default state (a voltage of the output terminal is the Low-level voltage and a voltage of the inverted output terminal is the High-level voltage) just before the inverted output signal of the second receiving rectangular wave signal (/RXDATA) rises from the Low-level voltage (0 V) to the High-level voltage (3 V).

Figure 3G:
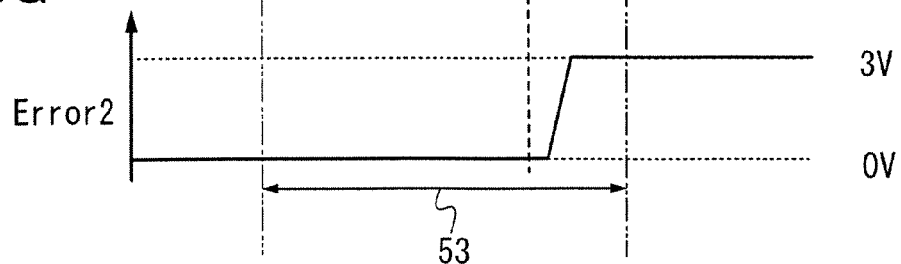

As shown in FIG. 3G, data of the data input terminal of the fourth D-FF 126b which is a High-level voltage becomes the second error signal (Error 2) and the second error signal (Error 2) rises at the timing at which the voltage of the clock terminal of the fourth D-FF 126b rises from the Low-level voltage to the High-level voltage.

The error signal is detected as an error "Signal Error". When an error is detected, a signal is transmitted and received again in a period in which the signal is detected as the error, so that the signal can be transmitted and received stably. In this embodiment, the period corresponds to the period 53, specifically, a period which is from just before generation of the noise "NOISE 1" to just after input of the pulse of B2. Thus, a highly reliable electronic circuit can be provided. Further, a highly reliable semiconductor device can be provided by using the electronic circuit.

Then, a period 54 is described in which noise "NOISE 2" is generated so as to cancel the Low-level voltage at the time of change of the transmitting rectangular wave signal (TX-DATA) from the High-level voltage to the Low-level voltage.

FIGS. 4A to 4F show the period 54 shown in FIGS. 2A to 2E in detail. FIG. 4A, FIG. 4B, FIG. 4C, FIG. 4D, FIG. 4E, and FIG. 4F illustrate changes over time in voltages of the transmitting rectangular wave signal (TXDATA) output to the coil 111 of the transmitting circuit 110 in the period 54, the induced electromotive force (VR) in the period 54, the pulsed signal of the node B in the period 54, the first receiving rectangular wave signal (RXDATA) in the period 54, an inverted output signal (/Q) of the first receiving rectangular wave signal (RXDATA) in the period 54, and the first error signal (Error 1) in the period 54, respectively.

Figure 4A:
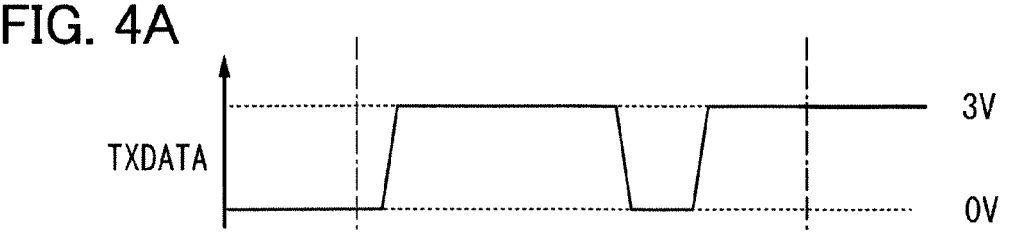
FIGS. 4A to 4F are timing diagrams explaining the receiving circuit of an embodiment of the present invention.
Figure 4B:
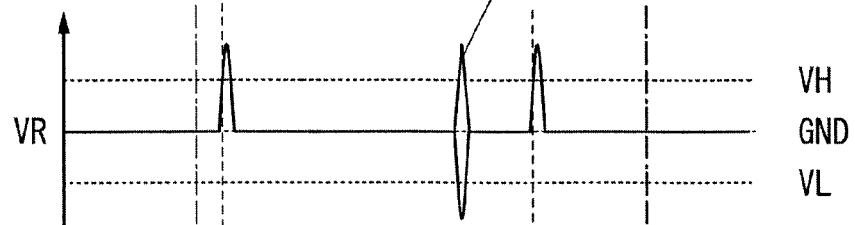
Figure 4C:
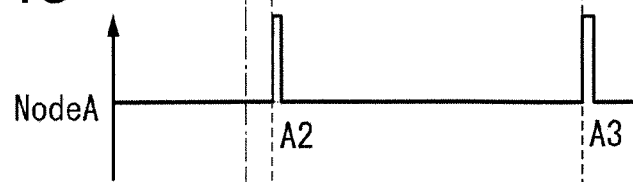
Figure 4D:
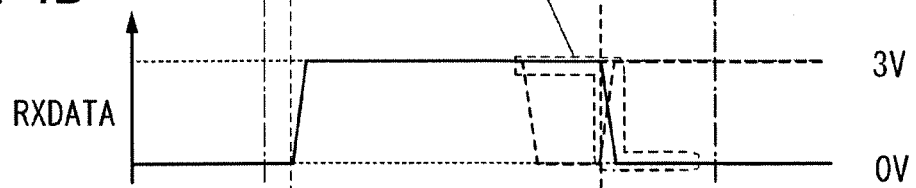

The original first receiving rectangular wave signal (RX-DATA) in which the noise "NOISE 2" is not generated changes from the High-level voltage (3 V) to the Low-level voltage (0 V) and changes from the Low-level voltage (0 V) to the High-level voltage (3 V), as shown by a short dashed line in FIG. 4D. The first receiving rectangular wave signal (RX-DATA) in which the noise "NOISE 2" is generated maintains the High-level voltage (3 V) as shown by a solid line in FIG. 4D, that is, a transmitted signal is wrong.

Because the Low-level voltage of the induced electromotive force (VR) is cancelled by the noise "NOISE2" in the period 54 shown in FIG. 4B, the induced electromotive force (VR) at that time is lower than the first reference voltage (VH) and higher than the second reference voltage (VL); as a result, neither a positive pulse nor a negative pulse rises.

When a positive pulse is output from the coil 121 of the receiving circuit 120 as shown in A2 in FIG. 4C, the induced electromotive force (VR) and the first reference voltage (VH) are compared by the first comparator 123a and when the induced electromotive force (VR) becomes higher than the first reference voltage (VH), the voltage of the node A changes from the Low-level voltage to the High-level voltage in accordance with the change. After that, the voltage of the node A converges to the Low-level voltage.

As shown in FIG. 4D, at the start of the period 54, the first receiving rectangular wave signal (RXDATA) is the Low-level voltage (0 V). The a voltage of data input terminal of the first D-FF 125a is the High-level voltage due to an inverted output signal of the first receiving rectangular wave signal (RXDATA).

The pulse of the node A is input to the clock terminal of the first D-FF 125a. Data of the data input terminal of the first D-FF 125a, which is the High-level voltage, becomes the first receiving rectangular wave signal (RXDATA) at the timing at which the pulse of the node A rises, so that the High-level voltage (3 V) is output.

Further, as shown in A3 in FIG. 4C, when a positive pulse is input to the coil 121 of the receiving circuit 120 at appropriate timing, the voltage of the node A changes from the Low-level voltage to the High-level voltage again by the first comparator 123a and the pulse of the node A is input to the clock terminal of the first D-FF 125a.

Figure 4E:
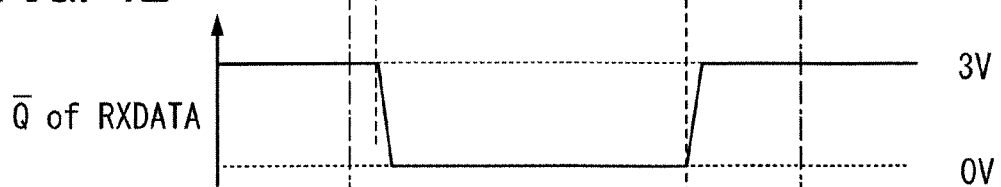

In addition, a voltage of the data input terminal of the first D-FF 125a is the Low-level voltage after the pulse A2 in FIG. 4C is generated. The first receiving rectangular wave signal (RXDATA) changes from the High-level voltage (3 V) to the Low-level voltage (0 V) at the timing at which the pulse rises. At the same time, as shown in FIG. 4E, the inverted output signal of the first receiving rectangular wave signal (RX-DATA) changes from the Low-level voltage (0 V) to the High-level voltage (3 V).

The second D-FF 125b is in the default state (a voltage of the output terminal is the Low-level voltage and a voltage of the inverted output terminal is the High-level voltage) just before the inverted output signal of the first receiving rectangular wave signal (RXDATA) rises from the Low-level voltage (0 V) to the High-level voltage (3 V).

Figure 4F:
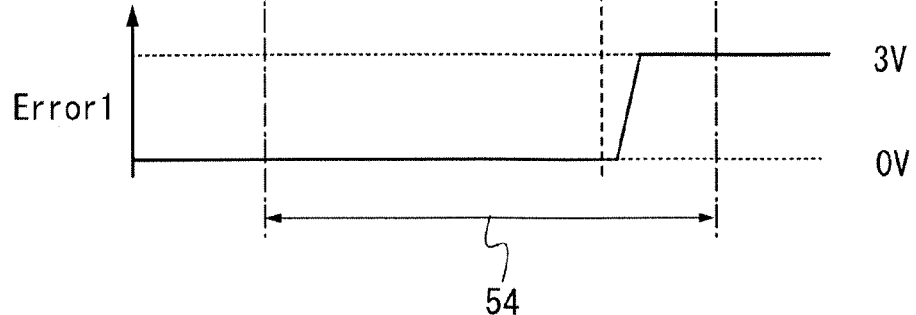

As shown in FIG. 4F, data of the data input terminal of the second D-FF 125b which is a High-level voltage becomes the first error signal (Error1) and the first error signal (Error1) rises at the timing at which the voltage of the clock terminal of the second D-FF 125b rises from the Low-level voltage to the High-level voltage.

The error signal is detected as an error "Signal Error". When an error is detected, a signal is transmitted and received again in a period in which the signal is detected as the error, so that the signal can be transmitted and received stably. In this embodiment, the period corresponds to the period 53, specifically, a period which is from just before input of the pulse of A2 to just after input of the pulse of A3. Thus, a highly reliable electronic circuit can be provided. Further, a highly reliable semiconductor device can be provided by using the electronic circuit.

This embodiment can be implemented in an appropriate combination with any of the other embodiments described in this specification.

Embodiment 2

In this embodiment, a receiving circuit of an embodiment of the present invention is described with reference to FIG. 5, FIGS. 6A to 6E, FIGS. 7A to 7F, and FIGS. 8A to 8E.
<Example of Circuit Configuration>

Figure 5:
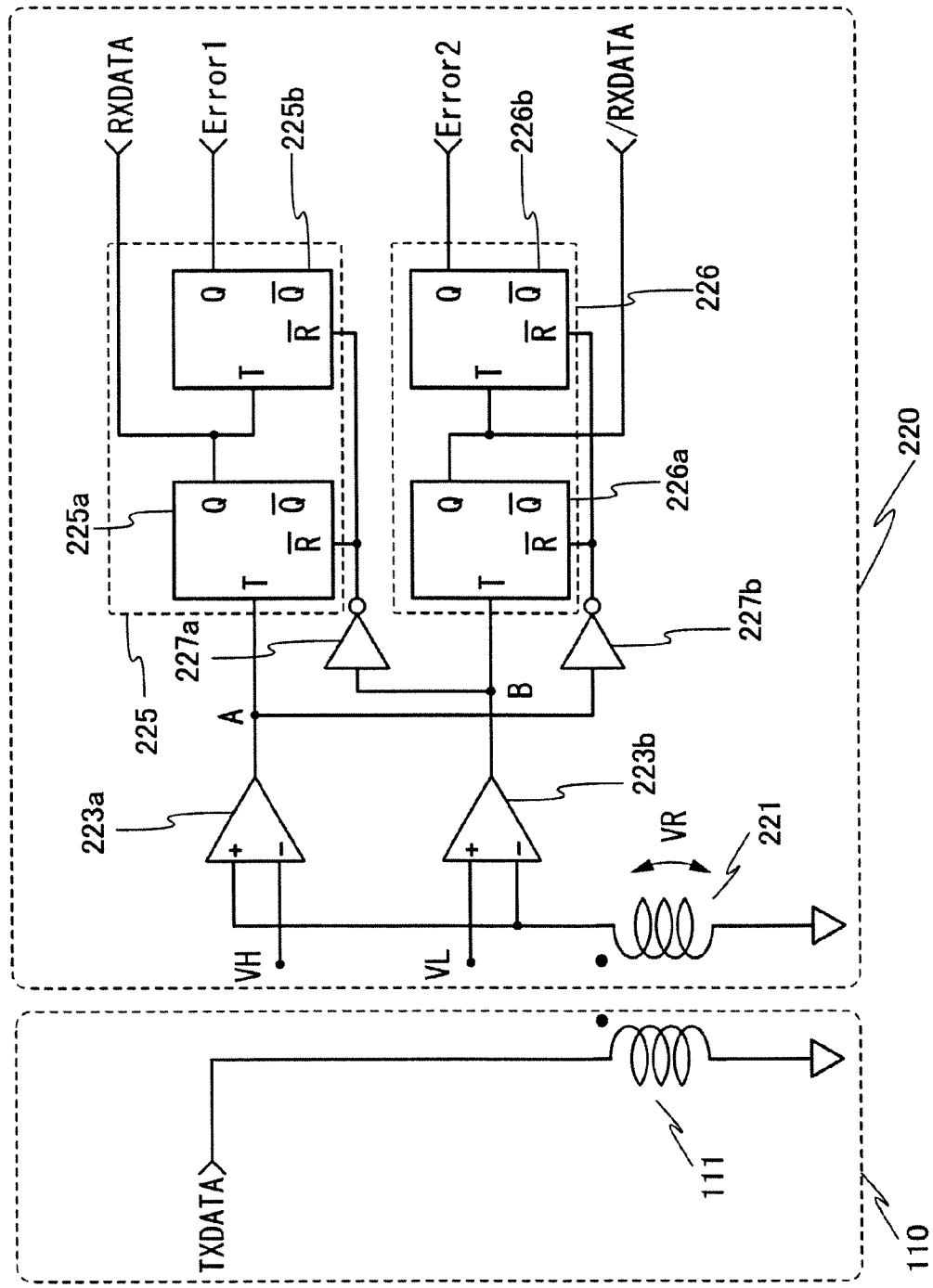
FIG. 5 is a diagram illustrating a receiving circuit of an embodiment of the present invention.

First, circuit configurations of a transmitting circuit 110 and a receiving circuit 220 which are described in this embodiment are explained with reference to FIG. 5. FIG. 5 illustrates part of the configuration of the transmitting circuit and an example of the configuration of the receiving circuit in which a T-type flip-flop (hereinafter referred to as Toggle-Flip-Flop or Triggered-Flip-Flop (T-FF)) is used for a first signal processing circuit shown in this embodiment and a second signal processing circuit shown in this embodiment.

The transmitting circuit 110 transmits the transmitting rectangular wave signal (TXDATA) with the use of a coil. The transmitting circuit 110 of this embodiment includes a coil 111 and has the same configuration as that in Embodiment 1.

The receiving circuit 220 includes a coil 221, a first comparator 223a, a second comparator 223b, a first signal processing circuit 225, a second signal processing circuit 226, a first inverter circuit 227a, and a second inverter circuit 227b.

The configuration of this embodiment is different from that of Embodiment 1 in that the first signal processing circuit 125 and the second signal processing circuit 126 are replaced with the first signal processing circuit 225 and the second signal processing circuit 226, respectively; the first inverter circuit 227a is provided between the second comparator 223b and the first signal processing circuit 225; and the second inverter circuit 227b is provided between the first comparator 223a and the second signal processing circuit 226.

The coil 221, the first comparator 223a, and the second comparator 223b can be similar to the coil 121, the first comparator 123a, and the second comparator 123b, respectively.

The first signal processing circuit 225 includes a first T-FF 225a and a second T-FF 225b. The second signal processing circuit 226 includes a third T-FF 226a and a fourth T-FF 226b.

In the following description of this embodiment, in the receiving circuit 220 shown in FIG. 5, a node formed by the connection of the first comparator 223a and a count input terminal of the first T-FF 225a is the node A. A node formed by the connection of the second comparator 223b and a count input terminal of the third T-FF 226a is the node B. The count input terminal of the first T-FF 225a and the count input terminal of the third T-FF 226a are described later.

The first T-FF 225a, the second T-FF 225b, the third T-FF 226a, and the fourth T-FF 226b each include a count input terminal (T), an inversion reset terminal (/R), an output terminal (Q), and an inverted output terminal (/Q).

The first receiving rectangular wave signal (RXDATA) is output from the output terminal (Q) of the first T-FF 225a. A first error signal (Error 1) is output from the output terminal (Q) of the second T-FF 225b. The second receiving rectangular wave signal (/RXDATA) is output from the output terminal (Q) of the third T-FF 226a. A second error signal (Error 2) is output from the output terminal (Q) of the fourth T-FF 226b.

An object is detection of error signals and therefore kinds of error signals are not necessarily distinguished. However, in this embodiment, error signals are distinguished between the first error signal (Error 1) and the second error signal (Error 2) in order to avoid confusion among components.

The first receiving rectangular wave signal (RXDATA) is input to the count input terminal of the second T-FF 225b. The second receiving rectangular wave signal (/RXDATA) is input to the count input terminal of the fourth T-FF 226b. An output of the first inverter circuit 227a is input to the inversion reset terminal of the first T-FF 225a and the inversion reset terminal of the second T-FF 225b. An output of the second inverter circuit 227b is input to the inversion reset terminal of the third T-FF 226a and the inversion reset terminal of the fourth T-FF 226b.

<Example of Circuit Operation>

Next, a circuit operation at the time of receiving a signal is described with reference to FIGS. 6A to 6E in addition to FIG. 5. FIGS. 6A to 6E are an example of timing diagrams at the time of transmission and reception of a signal. FIG. 6A, FIG. 6B, FIG. 6C, FIG. 6D, and FIG. 6E illustrate changes over time in voltages of the transmitting rectangular wave signal (TXDATA) input to the coil 111 of the transmitting circuit 110, the induced electromotive force (VR), a pulsed signal of the node A in FIG. 6B, a pulsed signal of the node B in FIG. 6B, and the first receiving rectangular wave signal (RXDATA), respectively.

Operation shown in FIGS. 6A to 6E is different from that of Embodiment 1 shown in FIGS. 2A to 2E in that timing at which the first receiving rectangular wave signal (RXDATA) rises from the Low-level voltage to the High-level voltage is at the time of fall of a pulse signal in this embodiment whereas the timing is at the time of rise of the pulse signal in Embodiment 1.

Firstly, an initial state of each T-FF is described. Note that a T-FF is a logic circuit operating by a signal with two values (the High-level voltage and the Low-level voltage). When a voltage of the count input terminal of the T-FF is the High-level voltage, the T-FF operates so that a signal of the output terminal and a signal of the inverted output terminal are switched. Initial states of the first T-FF 225a, the second T-FF 225b, and the fourth T-FF 226b are as follows: a voltage of the output terminal (Q) is the Low-level voltage and a voltage of the inverted output terminal (/Q) is the High-level voltage. An initial state of the third T-FF 226a is as follows: a voltage of the output terminal (Q) is the High-level voltage and a voltage of the inverted output terminal (/Q) is the Low-level voltage.

Further, in each T-FF, the High-level voltage is output when a voltage of the output terminal is the Low-level voltage at the timing at which a clock falls and the Low-level voltage is output when a voltage of the output terminal is the High-level voltage at the timing at which a clock falls; however, the timing is not limited thereto.

A period 61 shown in FIGS. 6A to 6E, in which the transmitting rectangular wave signal (TXDATA) changes from the Low-level voltage to the High-level voltage, is described. While the transmitting rectangular wave signal (TXDATA) changes to the High-level voltage, current flows through the coil 111 and a potential difference (the induced electromotive force VR) between both ends of the coil 221 is generated by electromagnetic induction.

Figure 6A:
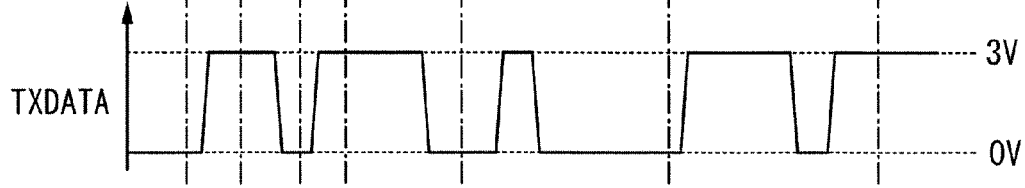
FIGS. 6A to 6E are timing diagrams explaining the receiving circuit of an embodiment of the present invention.
Figure 6B:
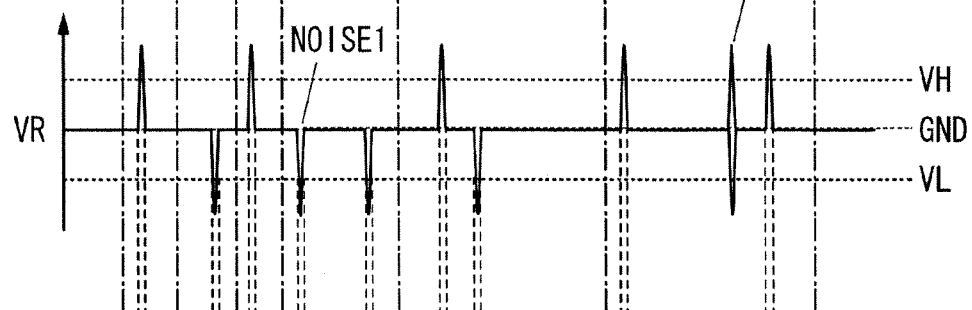

Since coupling coefficient between the coil 111 and the coil 221 is positive as described above, the induced electromotive force (VR) shows a positive pulse waveform as illustrated in FIG. 6B. In this embodiment, the Low-level voltage of the transmitting rectangular wave signal (TXDATA) is 0 V, the High-level voltage of the transmitting rectangular wave signal (TXDATA) is 3 V, and the induced electromotive force (VR) is 0 V in the initial state; however, an embodiment of the present invention is not limited thereto.

Figure 6C:
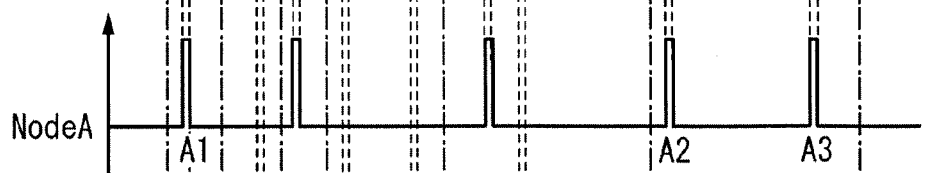

When a positive pulse is output from the coil 221 of the receiving circuit 220 as shown in A1 in FIG. 6C, the induced electromotive force (VR) and the first reference voltage (VH) are compared by the first comparator 223a and when the induced electromotive force (VR) becomes higher than the first reference voltage (VH), the voltage of the node A changes from the Low-level voltage to the High-level voltage in accordance with the change. After that, the voltage of the node A converges to the Low-level voltage.

Here, in the initial state, the first receiving rectangular wave signal (RXDATA) is the Low-level voltage. When the pulse of the node A is input to the count input terminal of the first T-FF

225a, the first receiving rectangular wave signal (RXDATA) changes from the Low-level voltage (0 V) to the High-level voltage (3 V) at the timing at which the pulse of the node A falls, and the High-level voltage (3 V) is output.

On the other hand, at the same time, an output (the Low-level voltage) of the second inverter circuit 227b is input to the inversion reset terminal of the third T-FF 226a and the inversion reset terminal of the fourth T-FF 226b.

In this manner, in the initial state, data of the High-level voltage (3 V) in the second receiving rectangular wave signal (/RXDATA) is reset and becomes a default state (a voltage each of the output terminals is the Low-level voltage, a voltage each of the inverted output terminals is the High-level voltage), and the Low-level voltage (0 V) is output as the second receiving rectangular wave signal (/RXDATA).

In this manner, in the period 61, when the transmitting rectangular wave signal (TXDATA) changes from the Low-level voltage (0 V) to the High-level voltage (3 V), the first receiving rectangular wave signal (RXDATA) changes from 0 V (the initial state) to 3 V (see FIG. 6E) and the second receiving rectangular wave signal (/RXDATA) changes from 3 V (the initial state) to 0 V (the default state) (not shown).

Next, a period 62 shown in FIGS. 6A to 6E in which the transmitting rectangular wave signal (TXDATA) changes from the High-level voltage to the Low-level voltage is described. While the transmitting rectangular wave signal (TXDATA) changes from the High-level voltage to the Low-level voltage, a potential difference (the induced electromotive force VR), whose direction is opposite to that in the above description is generated in the coil 221 by electromagnetic induction because coupling coefficient between the coil 111 and the coil 221 is positive as described above. That is to say, the induced electromotive force (VR) shows a negative pulse waveform.

Figure 6D:
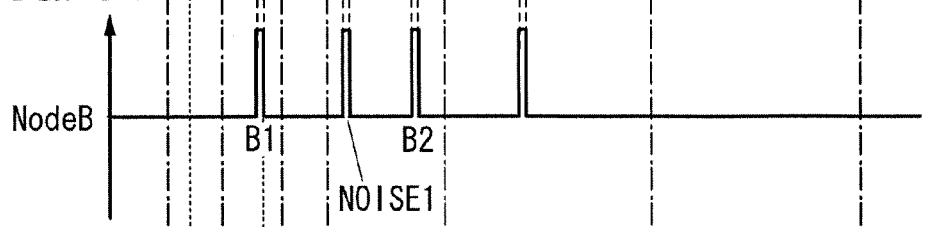
Figure 6E:
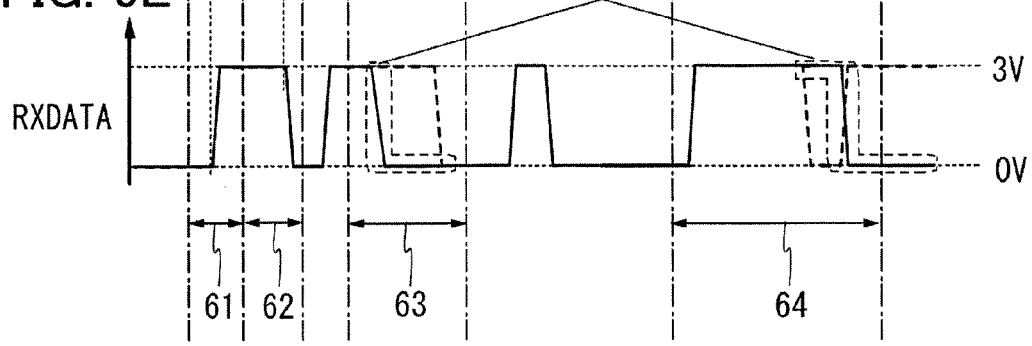

When a negative pulse is output from the coil 621 of the receiving circuit 620 as shown in B1 in FIG. 6D, similarly to the above, the induced electromotive force (VR) and the second reference voltage (VL) are compared by the second comparator 623b and when the induced electromotive force (VR) becomes lower than the second reference voltage (VL), the voltage of the node B changes from the Low-level voltage to the High-level voltage in accordance with the change. After that, the voltage of the node B converges to the Low-level voltage.

An output (the Low-level voltage) of the first inverter circuit 227a is input to the inversion reset terminal of the first T-FF 225a and the inversion reset terminal of the second T-FF 225b, so that data of the High-level voltage (3 V) in the first receiving rectangular wave signal (RXDATA) in the period 61 is reset. The first T-FF 225a and the second T-FF 225b go in the default state (a voltage of the output terminals (/Q) is the Low-level voltage and a voltage of the inverted output terminals (Q) is the High-level voltage), and the Low-level voltage (0 V) is output as the first receiving rectangular wave signal (RXDATA).

On the other hand, at the same time, by a process in the period 61, the second receiving rectangular wave signal (/RXDATA) is the Low-level voltage (0 V). When the pulse of the node B is input to the count input terminal of the third T-FF 226a, the second receiving rectangular wave signal (/RXDATA) changes from the Low-level voltage (0 V) to the High-level voltage (3 V) at the timing at which the pulse of the node B falls, and the High-level voltage (3 V) is output.

In this manner, in the period 62, when the transmitting rectangular wave signal (TXDATA) changes from the High-level voltage (3 V) to the Low-level voltage (0 V), the first receiving rectangular wave signal (RXDATA) changes from 3 V (in the period 61) to 0 V (the default state) (see FIG. 6E) and the second receiving rectangular wave signal (/RXDATA) changes from 0 V to 3 V (not shown).

In the case where noise is not generated as in the above case, the first receiving rectangular wave signal (RXDATA) reflects the transmitting rectangular wave signal (TXDATA), so that transmission and reception of data are performed normally. The pulse of the node A and the pulse of the node B are alternately generated; accordingly, data of the third T-FF 226a and the fourth T-FF 226b is reset by an output of the second inverter circuit 227b due to the pulse of the node A, so that no error signal rises.

Further, data of the first T-FF 225a and the second T-FF 225b is reset by an output of the second inverter circuit 227b due to the pulse of the node A, so that no error signal rises.

Then, a period 63 is described in which noise "NOISE 1" is generated during change of the transmitting rectangular wave signal (TXDATA) from the High-level voltage to the Low-level voltage.

FIGS. 7A to 7F show the period 63 shown in FIGS. 6A to 6E in detail. FIG. 7A, FIG. 7B, FIG. 7C, FIG. 7D, FIG. 7E, and FIG. 7F illustrate changes over time in voltages of the transmitting rectangular wave signal (TXDATA) output to the coil 111 of the transmitting circuit 110 in the period 63, the induced electromotive force (VR) in the period 63, the pulsed signal of the node B in the period 63, the first receiving rectangular wave signal (RXDATA) in the period 63, the second receiving rectangular wave signal (/RXDATA) in the period 63, and the second error signal (Error2) in the period 63, respectively.

Operation shown in FIGS. 7A to 7E is different from that of Embodiment 1 shown in FIGS. 3A to 3G in that timing at which the first receiving rectangular wave signal (RXDATA) rises from the Low-level voltage to the High-level voltage is at the time of fall of a pulse signal in this embodiment whereas the timing is at the time of rise of the pulse signal in Embodiment 1.

Figure 7A:
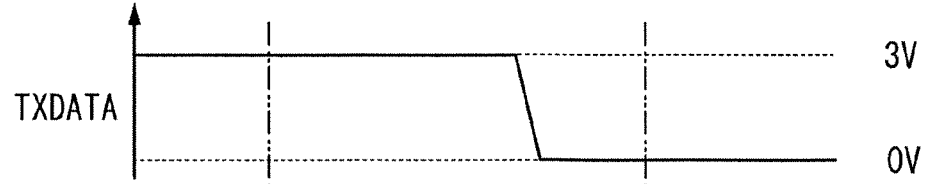
FIGS. 7A to 7F are timing diagrams explaining the receiving circuit of an embodiment of the present invention.
Figure 7B:
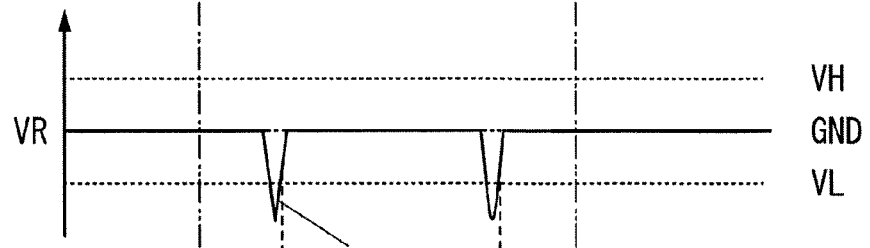
Figure 7C:
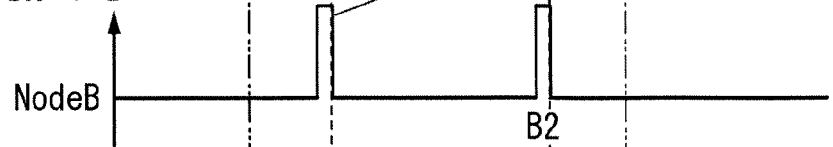
Figure 7D:
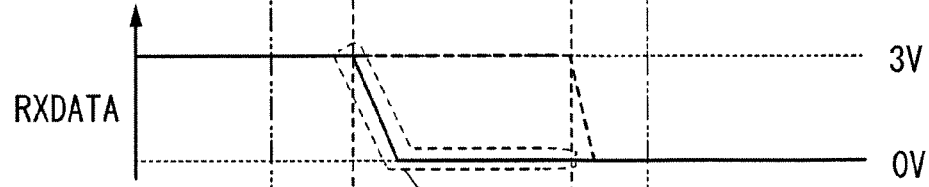

The original first receiving rectangular wave signal (RXDATA) in which the noise "NOISE 1" is not generated changes from the High-level voltage (3 V) to the Low-level voltage (0 V) as shown by a short dashed line in FIG. 7D. The first receiving rectangular wave signal (RXDATA) in which the noise "NOISE1" is generated changes from the High-level voltage (3 V) to the Low-level voltage (0 V) as shown by a solid line in FIG. 7D, that is, a transmitted signal is wrong.

When a negative pulse is output from the coil 221 of the receiving circuit 220 as shown in the noise "NOISE 1" in FIG. 7C, the induced electromotive force (VR) and the second reference voltage (VL) are compared by the second comparator 223b and when the induced electromotive force (VR) becomes lower than the second reference voltage (VL), the voltage of the node B changes from the Low-level voltage to the High-level voltage in accordance with the change. After that, the voltage of the node B converges to the Low-level voltage.

Figure 7E:
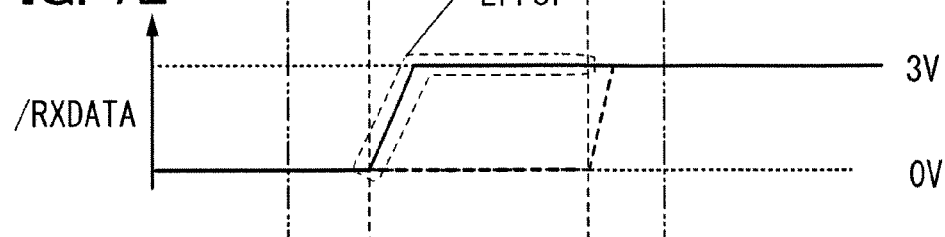

As shown in FIG. 7E, at the start of the period 63, the second receiving rectangular wave signal (/RXDATA) is the Low-level voltage (0V). When the pulse of the node B is input to the count input terminal of the third T-FF 226a, the second receiving rectangular wave signal (/RXDATA) changes from the Low-level voltage (0 V) to the High-level voltage (3 V) at the timing at which the pulse of the node B falls, and the High-level voltage (3 V) is output.

Further, at the same time, the voltage of the count input terminal of the fourth T-FF 226b (T) rises from the Low-level voltage (0 V) to the High-level voltage (3 V).

Further, as shown in B2 in FIG. 7C, when a negative pulse is input to the coil 221 of the receiving circuit 220 at appropriate timing, the voltage of the node B changes from the Low-level voltage to the High-level voltage again by the second comparator 223b, and the pulse of the node B is input to the third T-FF 226a as a clock signal.

In addition, the second receiving rectangular wave signal (/RXDATA) of the third T-FF 226a is the High-level voltage after the noise "NOISE 1" is generated. The second receiving rectangular wave signal (/RXDATA) changes from the High-level voltage (3 V) to the Low-level voltage (0 V) at the timing at which the pulse falls.

Figure 7F:
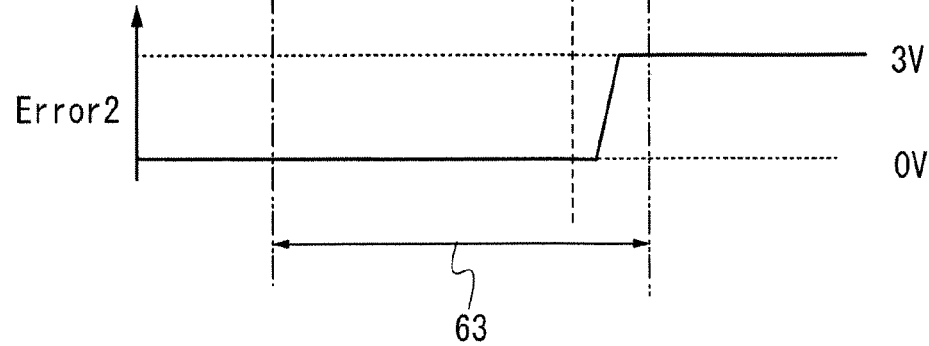

At the same time, as shown in FIG. 7F, the voltage of the count input terminal of the fourth T-FF 226b falls from the High-level voltage (3 V) to the Low-level voltage. The second error signal (Error 2) rises from the Low-level voltage (0 V) to the High-level voltage (3 V).

The error signal is detected as an error "Signal Error". When an error is detected, a signal is transmitted and received again in a period in which the signal is detected as the error, so that the signal can be transmitted/received stably. In this embodiment, the period corresponds to the period 53, specifically, a period which is from just before generation of the noise "NOISE1" to just after input of the pulse of B2. Thus, a highly reliable electronic circuit can be provided. Further, a highly reliable semiconductor device can be provided by using the electronic circuit.

Then, a period 54 is described in which noise "NOISE 2" is generated so as to cancel the Low-level voltage at the time of change of the transmitting rectangular wave signal (TXDATA) from the High-level voltage to the Low-level voltage.

FIGS. 8A to 8E show the period 64 shown in FIGS. 6A to 6E in detail. FIG. 8A, FIG. 8B, FIG. 8C, FIG. 8D, and FIG. 8E illustrate changes over time in voltages of the transmitting rectangular wave signal (TXDATA) output to the coil 111 of the transmitting circuit 110 in the period 64, the induced electromotive force (VR) in the period 64, the pulsed signal of the node B in the period 64, the first receiving rectangular wave signal (RXDATA) in the period 64, and the first error signal (Error1) in the period 64, respectively.

Operation shown in FIGS. 8A to 8E is different from that of Embodiment 1 shown in FIGS. 4A to 4F in that timing at which the first receiving rectangular wave signal (RXDATA) rises from the Low-level voltage to the High-level voltage is at the time of fall of a pulse signal in this embodiment whereas the timing is at the time of rise of the pulse signal in Embodiment 1.

Figure 8A:
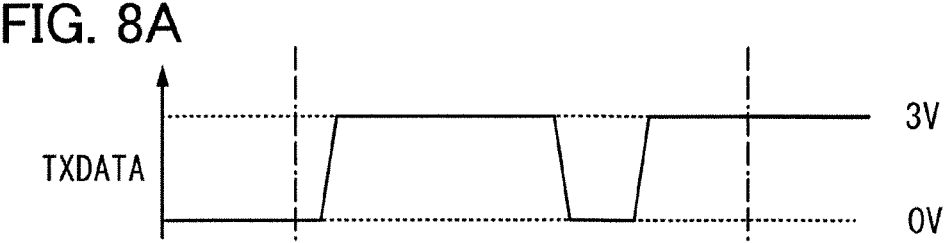
FIGS. 8A to 8E are timing diagrams explaining the receiving circuit of an embodiment of the present invention.
Figure 8B:
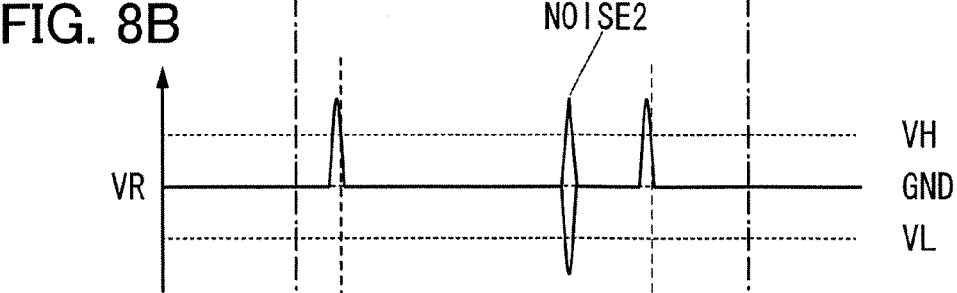
Figure 8C:
Figure 8D:
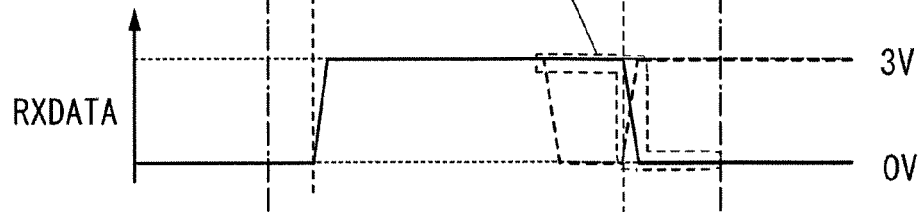

The original first receiving rectangular wave signal (RXDATA) in which the noise "NOISE 2" is not generated changes from the Low-level voltage (0 V) to the High-level voltage (3 V) twice, as shown by a short dashed line in FIG. 8D. The first receiving rectangular wave signal (RXDATA) in which the noise "NOISE 2" is generated maintains the High-level voltage (3 V) as shown by a solid line in FIG. 8D, that is, a transmitted signal is wrong.

Because the Low-level voltage of the induced electromotive force (VR) is cancelled by the noise "NOISE2" in the period 64 shown in FIG. 8B, the induced electromotive force (VR) at that time is lower than the first reference voltage (VH) and higher than the second reference voltage (VL); as a result, neither a positive pulse nor a negative pulse rises.

When a positive pulse is output from the coil 221 of the receiving circuit 220 as shown in A2 in FIG. 8C, the induced electromotive force (VR) and the first reference voltage (VH) are compared by the first comparator 223a and when the induced electromotive force (VR) becomes higher than the first reference voltage (VH), the voltage of the node A changes from the Low-level voltage to the High-level voltage in accordance with the change. After that, the voltage of the node A converges to the Low-level voltage.

As shown in FIG. 8D, at the start of the period 64, the first receiving rectangular wave signal (RXDATA) is the Low-level voltage (0 V). When the pulse of the node A is input to the count input terminal of the first T-FF 225a, the first receiving rectangular wave signal (RXDATA) changes from the Low-level voltage (0 V) to the High-level voltage (3 V) at the timing at which the pulse of the node A falls, and the High-level voltage (3 V) is output.

Further, at the same time, the voltage of the count input terminal of the second T-FF 225b (T) rises from the Low-level voltage (0 V) to the High-level voltage (3 V).

Further, as shown in A3 in FIG. 8C, when a positive pulse is input to the coil 221 of the receiving circuit 220 at appropriate timing, the voltage of the node A changes from the Low-level voltage to the High-level voltage again by the first comparator 223a, and the pulse of the node A is input to the first T-FF 225a as a clock signal.

In addition, the first receiving rectangular wave signal (RXDATA) of the first T-FF 225a is the High-level voltage after the pulse A2 in FIG. 8C is generated. The first receiving rectangular wave signal (RXDATA) changes from the High-level voltage (3 V) to the Low-level voltage (0 V) at the timing at which the pulse falls.

Figure 8E:
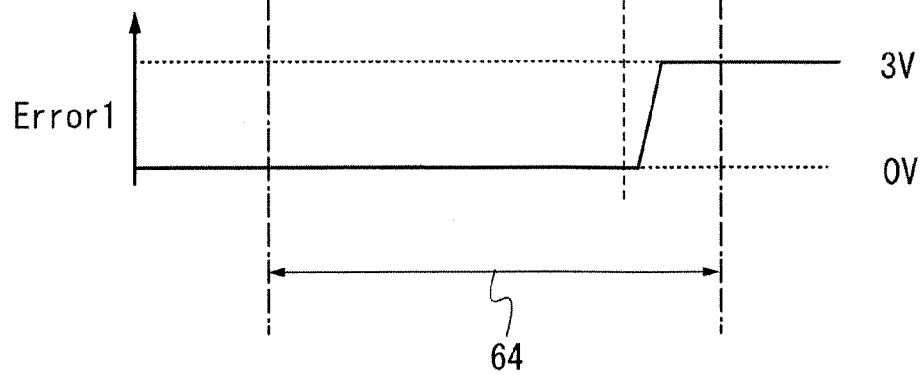

At the same time, as shown in FIG. 8E, the voltage of the count input terminal of the second T-FF 225b falls from the High-level voltage (3 V) to the Low-level voltage. The first error signal (Error 1) rises from the Low-level voltage (0 V) to the High-level voltage (3 V).

The error signal is detected as an error "Signal Error". When an error is detected, a signal is transmitted and received again in a period in which the signal is detected as the error, so that the signal can be transmitted and received stably. In this embodiment, the period corresponds to the period 64. Thus, a highly reliable electronic circuit can be provided. Further, a highly reliable semiconductor device can be provided by using the electronic circuit.

This embodiment can be implemented in an appropriate combination with any of the other embodiments described in this specification.

Embodiment 3

In this embodiment, an example of an LSI chip (IC chip) on which a receiving circuit and a transmitting circuit of an embodiment of the present invention are mounted is described with reference to FIG. 9.

Figure 9:
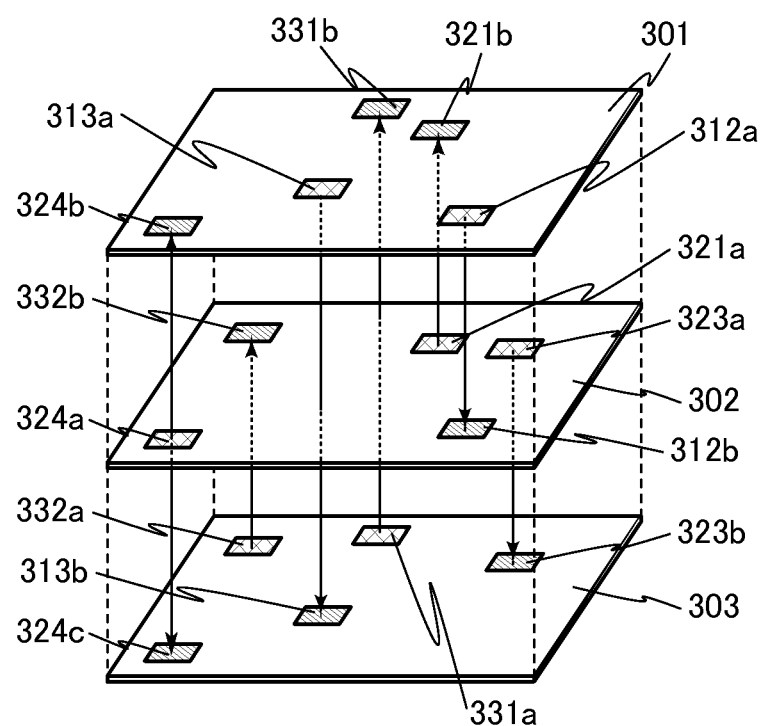
FIG. 9 is a diagram illustrating an LSI chip of an embodiment of the present invention.

FIG. 9 is a schematic view illustrating structures of stacked three LSI chips and transmission and reception of signals among the LSI chips. LSI chips 301 to 303 shown in FIG. 9 each include a plurality of receiving circuits and a plurality of transmitting circuits. Arrows illustrated in FIG. 9 show directions of signals transmitted from the transmitting circuits to the receiving circuits.

Transmission and reception of a signal among the LSI chips is performed by using a pair of a transmitting circuit and a receiving circuit, which are provided in the LSI chips. Accordingly, when the LSI chips are stacked, coils of the pair of the transmitting circuit and the receiving circuit are preferably provided so as to almost overlap with each other, whereby coupling coefficient between the coils can be enhanced. The sizes and the shapes of the coils each included in the transmitting circuit and the receiving circuit may be set as appropriate in accordance with the chip sizes of the LSI chips and the distance between the stacked LSI chips. For example, a coil with a diagonal of 10 μm to several hundred μm may be used.

Each LSI chip is connected to a power supply line supplying a power supply voltage. A signal for supplying electric power, such as a sine wave, is transmitted from an LSI chip connected to the power supply line; another LSI chip receives the signal; and the power supply voltage may then be generated with the use of a rectifier circuit, a constant-voltage circuit, or/and the like.

In addition, each LSI chip is connected to a wiring to which a clock signal for synchronizing operations of the LSI chips is input. Further, an LSI chip may transmit such a clock signal and another LSI chip may receive the clock signal so that the operations of the LSI chips are synchronized.

In the case of the LSI chip 301 and the LSI chip 302, a transmitting circuit 312a transmits a signal to a receiving circuit 312b and a transmitting circuit 321a transmits a signal to a receiving circuit 321b. In the case of the LSI chip 302 and the LSI chip 303, a transmitting circuit 323a transmits a signal to a receiving circuit 323b and a transmitting circuit 332a transmits a signal to a receiving circuit 332b. In the case of the LSI chip 301 and the LSI chip 303, a transmitting circuit 313a transmits a signal to a receiving circuit 313b and a transmitting circuit 331a transmits a signal to a receiving circuit 331b.

Further, as shown in FIG. 9, a receiving circuit 324b and a receiving circuit 324c each receive a signal transmitted from a transmitting circuit 324a of the LSI chip 302, and accordingly, the LSI chip 301 and the LSI chip 303 also can receive the same signal.

In this manner, a plurality of LSI chips are stacked so that a receiving circuit and a transmitting circuit overlap with each other; therefore, communication can be achieved without leading a wiring even when another LSI chip is sandwiched between the LSI chips.

In this embodiment, three LSI chips are stacked; however the number of LSI chips to be stacked is not limited thereto and may be two and four or more.

Here, in the case where four or more LSI chips are stacked, two or more pairs of transmitting circuits and receiving circuits which have coils different in shape are provided to overlap with each other; therefore, an increase in chip size can be suppressed. For example, one of coils is formed to have one loop and the other is formed to have two loops. The other coil is formed so that the magnetic fields of the loops have the same magnetic field strength and phases opposite to each other. The magnetic fields of such two coils do not interfere with the coils even if the coils overlap with each other; therefore, the communication can be performed without a malfunction even when two or more pairs of the receiving circuits and the transmitting circuits are provided to overlap with each other.

Note that the LSI chip may include a thin film transistor formed over a thin film such as a thin resin film. An LSI chip with such a structure can be as thin as a thickness of about several to several tens of micrometers. A receiving circuit and a transmitting circuit are provided in such an LSI chip, so that coupling coefficient between coils can be enhanced. Such an LSI chip is preferable because the size of coil can be small and wireless communication can be achieved with low power consumption. Such a thin LSI chip can be formed as follows: an LSI chip is directly provided on a heat-resistant resin substrate or is formed over a glass substrate in which a separation layer is provided, and then, the LSI chip is separated and transported to a thin film such as a thin resin film.

The receiving circuit and the transmitting circuit shown in the above embodiment is used as a receiving circuit and a transmitting circuit included in such an LSI chip; accordingly, a signal can be transmitted and received stably when the signal is transmitted and received again at the time of detection of an error. Therefore, a highly reliable semiconductor device can be provided. A stack of LSI chips which can conduct communication wirelessly and has a small size of chip can be provided. Further, a plurality of receiving circuits and transmitting circuits which are described above are provided in the LSI chip, so that the LSI chip can be smaller effectively.

This embodiment can be implemented in an appropriate combination with any of the other embodiments described in this specification.

Embodiment 4

In this embodiment, as an example of a memory medium on which a receiving circuit and a transmitting circuit of an embodiment of the present invention are mounted, a structure example of a memory card is described with reference to FIGS. 10A and 10B.

Figure 10A:
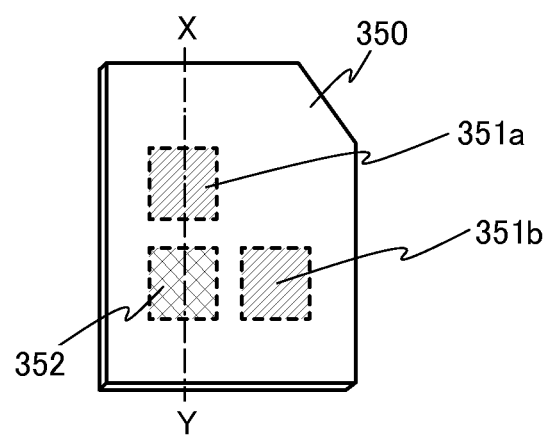
FIGS. 10A and 10B are diagrams illustrating a memory card of an embodiment of the present invention.

FIG. 10A is a schematic view of a memory card 350 illustrated in this embodiment. The memory card 350 includes two receiving circuits (a receiving circuit 351a and a receiving circuit 351b) and one transmitting circuit (a transmitting circuit 352).

The receiving circuit 351a receives a signal for generating a power supply voltage. On the other hand, the receiving circuit 351b receives a data signal from an electronic device. The transmitting circuit 352 transmits data or the like written to the memory card to the electronic device.

The memory card 350 includes a control circuit which is not shown. The control circuit is connected to the receiving circuit 351a, the receiving circuit 351b, and the transmitting circuit 352. The control circuit controls operation such as writing and reading data to and from a memory element that is described later in accordance with a signal which is received by the receiving circuit 351a and the receiving circuit 351b, and controls an operation of the transmitting circuit 352 so that a transmitting signal is output from the transmitting circuit 352 as necessary.

The memory card 350 includes the memory element. Data can be written to the memory element in accordance with a writing signal from the electronic device. Data written to the memory card 350 can be read in accordance with a reading signal from the electronic device. Examples of the memory element included in the memory card 350 are a programmable and erasable memory such as a flash memory, a ferroelectric random access memory, a magnetoresistive random access memory, a phase-change memory, or a resistive random access memory; and a nonvolatile memory such as a one time programmable (OTP) memory. In the case where a power source such as a battery is included in a memory card, a volatile memory such as SRAM or DRAM may be mounted.

Figure 10B:
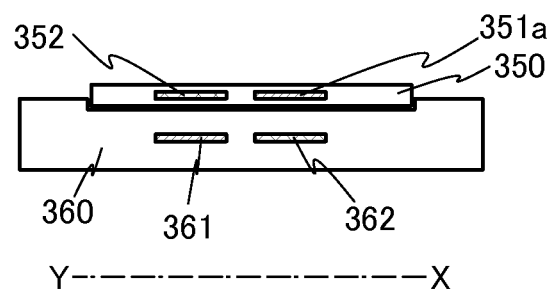
Figure 11:
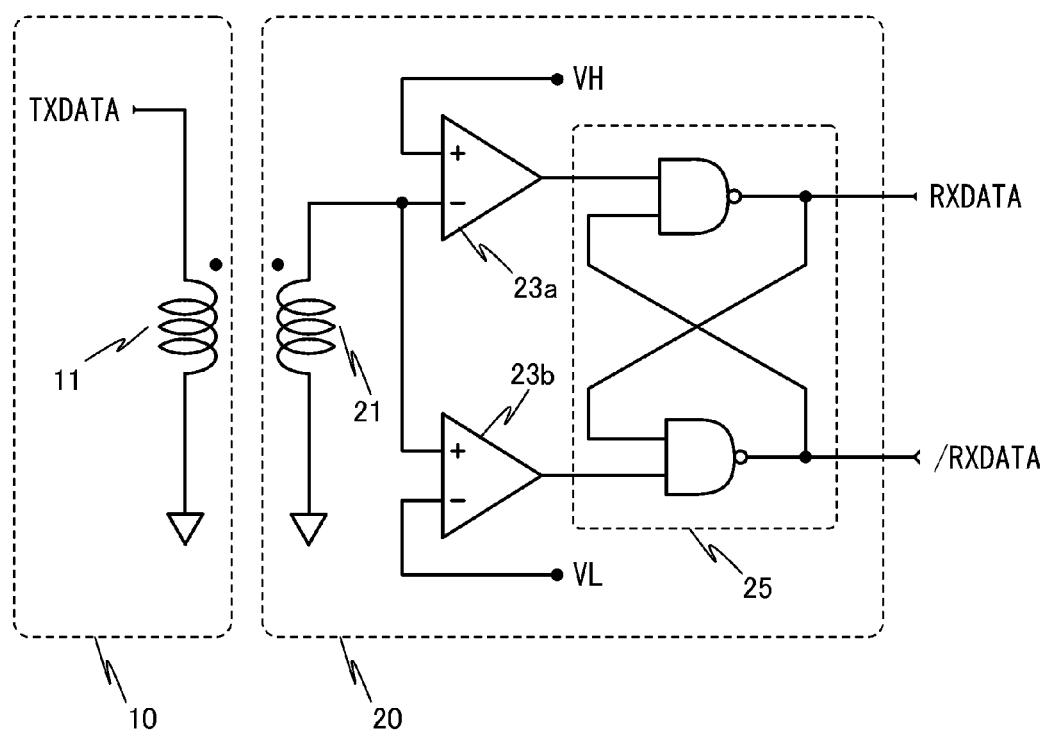
FIG. 11 is a diagram illustrating the configuration example of a conventional receiving circuit.
Figure 12A:
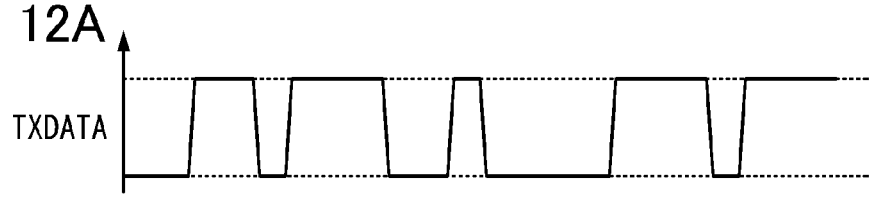
FIGS. 12A to 12C are timing diagrams of the conventional receiving circuit.
Figure 12B:
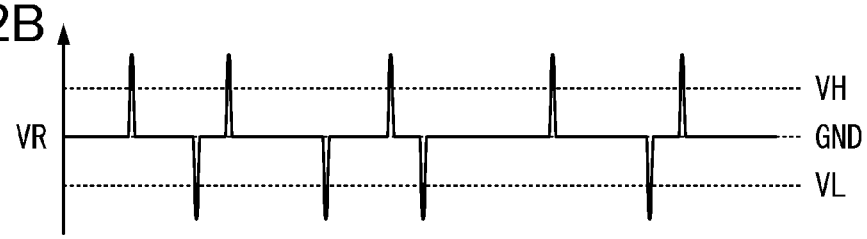
Figure 12C:
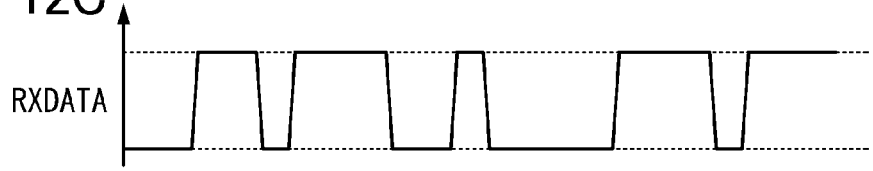
Figure 13A:
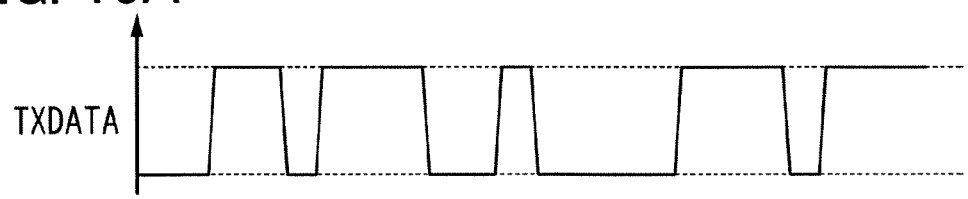
FIGS. 13A to 13C are timing diagrams in the case where error signals are generated in the conventional receiving circuit.
Figure 13B:
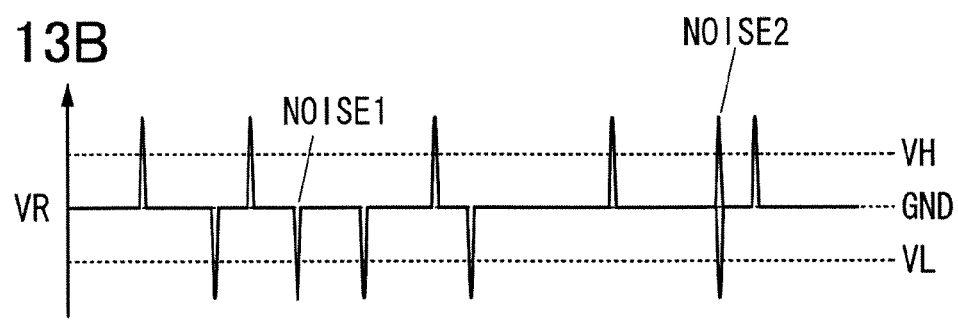
Figure 13C:
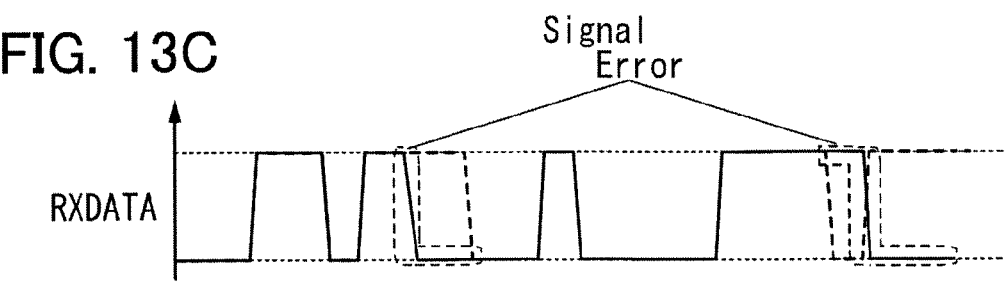

FIG. 10B is a cross-sectional schematic view in the case where signals are transmitted and received between an electronic device 360 and the memory card 350. FIG. 10B corresponds to a cross section taken along a chain line X-Y in FIG. 10A.

The electronic device 360 includes a receiving circuit 361, a transmitting circuit 362, and a transmitting circuit which is not illustrated. A depression is provided in the electronic device 360 and allows the memory card 350 to be provided so that the receiving circuit 351a, the receiving circuit 351b, and the transmitting circuit 352 of the memory card 350 overlap with the transmitting circuit 362, the transmitting circuit which is not shown, and the receiving circuit 361 of the electronic device 360 in the range where communication can be achieved.

With using such a memory card and an electronic device, an area can be drastically reduced by omitting an exposed part of a contact electrode; therefore, the memory card can be downsized. Further, the exposed electrode is not needed; accordingly, a water-proof property can be given by covering with a resin or the like and a slot for inserting a card can be omitted from the electronic device.

Note that in this embodiment, two receiving circuits and one transmitting circuit are provided for the memory card; however, the numbers of circuits are not limited thereto. For example, a plurality of receiving circuits can be provided to receive signals in parallel, whereby the transmitting and receiving speed of a signal can be higher.

Further, in this embodiment, the transmitting circuits and the receiving circuits of the memory card and the electronic device are placed in a line. However, these circuits can be stacked, having coils with different shapes, similarly to the case described in Embodiment 3.

Furthermore, in this embodiment, a depression is provided in the electronic device to align the position of the memory card and the position of the electronic device. However, any structure can be employed as long as the positions are aligned. For example, a depression may be provided in a memory card and a projection portion with a shape corresponding to the depression may be provided in an electronic device.

Moreover, in this embodiment, an end of the memory card is cut out to clarify the front and back sides and the direction. However, any structure can be employed as long as the front and the back sides and the direction of the memory card are clarified. For example, a depression and a projection may be provided for the surface of the memory card, or a character and a mark may be used.

The receiving circuit and the transmitting circuit shown in the above embodiment are mounted for such a memory card; accordingly, a signal can be transmitted and received stably when the signal is transmitted and received again at the time of detection of an error. Therefore, a highly reliable semiconductor device can be provided. It is possible to obtain the memory card where the wireless communication can be performed and the size is smaller than the size of a conventional memory card. Furthermore, the receiving circuit and the transmitting circuit shown in the above embodiment are used for a receiving circuit and a transmitting circuit of the electronic device, whereby the size of the electronic device can be smaller. Further, a plurality of receiving circuits and transmitting circuits which are described above are provided in the memory card or the electronic device, so that the size of the memory card or the electronic device can be smaller effectively.

This embodiment can be implemented in an appropriate combination with any of the other embodiments described in this specification.

This application is based on Japanese Patent Application serial no. 2010-258446 filed with Japan Patent Office on Nov. 19, 2010, the entire contents of which are hereby incorporated by reference.

What is claimed is:

1. A semiconductor device comprising:
a coil configured to generate an induced electromotive force by utilizing electromagnetic induction;
a first comparator configured to compare the induced electromotive force with a first reference potential and to output a first pulse signal in the case where the induced electromotive force is higher than the first reference potential;
a second comparator configured to compare the induced electromotive force with a second reference potential and output a second pulse signal in the case where the induced electromotive force is lower than the second reference potential;
a first signal processing circuit,
wherein the first signal processing circuit is configured to output a first receiving rectangular wave signal when the first pulse signal is output,
wherein the first signal processing circuit is configured to output a first error signal when the first pulse signal is output twice or more in succession, and
wherein a data in the first signal processing circuit is reset when the second pulse signal is output; and
a second signal processing circuit,
wherein the second signal processing circuit is configured to output a second receiving rectangular wave signal when the second pulse signal is output,
wherein the second signal processing circuit is configured to output a second error signal when the second pulse signal is output twice or more in succession, and
wherein a data in the second signal processing circuit is reset when the first pulse signal is output.

2. The semiconductor device according to claim 1,
wherein the first signal processing circuit comprises a first D-type flip-flop and a second D-type flip-flop,
wherein the first D-type flip-flop comprises a first clock terminal, a first output terminal, a first inverted output terminal, a first data input terminal, and a first reset terminal,
wherein the second D-type flip-flop comprises a second clock terminal, a second output terminal, a second inverted output terminal, a second data input terminal, and a second reset terminal,
wherein the second signal processing circuit comprises a third D-type flip-flop and a fourth D-type flip-flop,
wherein the third D-type flip-flop comprises a third clock terminal, a third output terminal, a third inverted output terminal, a third data input terminal, and a third reset terminal,
wherein the fourth D-type flip-flop comprises a fourth clock terminal, a fourth output terminal, a fourth inverted output terminal, a fourth data input terminal, and a fourth reset terminal,
wherein the first pulse signal is input to the first clock terminal, the third reset terminal, and the fourth reset terminal,
wherein the first receiving rectangular wave signal is output from the first output terminal,
wherein an inverted output signal of the first receiving rectangular wave signal is input to the first data input terminal and the second clock terminal,
wherein the first error signal is output from the second output terminal,
wherein an inverted output signal of the first error signal is input to the second data input terminal,
wherein the second pulse signal is input to the third clock terminal, the first reset terminal, and the second reset terminal,
wherein the second receiving rectangular wave signal is output from the third output terminal,
wherein an inverted output signal of the second receiving rectangular wave signal is input to the third data input terminal and the fourth clock terminal, wherein the second error signal is output from the fourth output terminal, and wherein an inverted output signal of the second error signal is input to the fourth data input terminal.

3. The semiconductor device according to claim 1, further comprising:
a first inverter circuit between the second comparator and the first signal processing circuit; and
a second inverter circuit between the first comparator and the second signal processing circuit,
wherein the first signal processing circuit comprises a first T-type flip-flop and a second T-type flip-flop,
wherein the first T-type flip-flop comprising a first count input terminal, a first output terminal, a first inverted output terminal, and a first inversion reset terminal,
wherein the second T-type flip-flop comprises a second count input terminal, a second output terminal, a second inverted output terminal, and a second inversion reset terminal,
wherein the first pulse signal is input to the first count input terminal and the second inverter circuit,
wherein the first receiving rectangular wave signal is output from the first output terminal and is input to the second count input terminal,
wherein the second signal processing circuit comprises a third T-type flip-flop and a fourth T-type flip-flop,
wherein the third T-type flip-flop comprises a third count input terminal, a third output terminal, a third inverted output terminal, and a third inversion reset terminal,
wherein the fourth T-type flip-flop comprises a fourth count input terminal, a fourth output terminal, a fourth inverted output terminal, and a fourth inversion reset terminal,
wherein the second pulse signal is input to the third count input terminal and the first inverter circuit, and
wherein the second receiving rectangular wave signal is output from the third output terminal and is input to the fourth count input terminal.

4. A semiconductor device comprising:
a first integrated circuit comprising a transmitting circuit; and
a second integrated circuit comprising a receiving circuit,
wherein the transmitting circuit comprises a first coil configured to output a transmitting signal,
wherein the receiving circuit comprises:
  a second coil configured to generate an induced electromotive force by utilizing electromagnetic induction in accordance to the transmitting signal;
  a first comparator configured to compare the induced electromotive force with a first reference potential and to output a first pulse signal in the case where the induced electromotive force is higher than the first reference potential;
  a second comparator configured to compare the induced electromotive force with a second reference potential and outputs a second pulse signal in the case where the induced electromotive force is lower than the second reference potential;
  a first signal processing circuit,
  wherein the first signal processing circuit is configured to output a first receiving rectangular wave signal when the first pulse signal is output,
  wherein the first signal processing circuit is configured to output a first error signal when the first pulse signal is output twice or more in succession; and
  wherein a data is reset when the second pulse signal is output is reset; and a second signal processing circuit,
  wherein the second signal processing circuit is configured to output a second receiving rectangular wave signal when the second pulse signal is output,
  wherein the second signal processing circuit is configured to output a second error signal when the second pulse signal is output twice or more in succession, and
  wherein a data in the second signal processing circuit is reset when the first pulse signal is output.

5. The semiconductor device according to claim 4,
wherein the first signal processing circuit comprises a first D-type flip-flop and a second D-type flip-flop,
wherein the first D-type flip-flop comprises a first clock terminal, a first output terminal, a first inverted output terminal, a first data input terminal, and a first reset terminal,
wherein the second D-type flip-flop comprises a second clock terminal, a second output terminal, a second inverted output terminal, a second data input terminal, and a second reset terminal,
wherein the second signal processing circuit comprises a third D-type flip-flop and a fourth D-type flip-flop,
wherein the third D-type flip-flop comprises a third clock terminal, a third output terminal, a third inverted output terminal, a third data input terminal, and a third reset terminal,
wherein the fourth D-type flip-flop comprises a fourth clock terminal, a fourth output terminal, a fourth inverted output terminal, a fourth data input terminal, and a fourth reset terminal,
wherein the first pulse signal is input to the first clock terminal, the third reset terminal, and the fourth reset terminal,
wherein the first receiving rectangular wave signal is output from the first output terminal,
wherein an inverted output signal of the first receiving rectangular wave signal is input to the first data input terminal and the second clock terminal,
wherein the first error signal is output from the second output terminal,
wherein an inverted output signal of the first error signal is input to the second data input terminal,
wherein the second pulse signal is input to the third clock terminal, the first reset terminal, and the second reset terminal,
wherein the second receiving rectangular wave signal is output from the third output terminal,
wherein an inverted output signal of the second receiving rectangular wave signal is input to the third data input terminal and the fourth clock terminal,
wherein the second error signal is output from the fourth output terminal, and
wherein an inverted output signal of the second error signal is input to the fourth data input terminal.

6. The semiconductor device according to claim 5,
wherein the first integrated circuit and the second integrated circuit are stacked.

7. The semiconductor device according to claim 5,
wherein the first integrated circuit and the second integrated circuit are adjacent to each other.

8. The semiconductor device according to claim 5,
wherein the first integrated circuit further comprises a receiving circuit, and
wherein the second integrated circuit further comprises a transmitting circuit.

9. The semiconductor device according to claim 4, further comprising:

a first inverter circuit between the second comparator and the first signal processing circuit; and
a second inverter circuit between the first comparator and the second signal processing circuit,
wherein the first signal processing circuit comprises a first T-type flip-flop and a second T-type flip-flop,
wherein the first T-type flip-flop comprising a first count input terminal, a first output terminal, a first inverted output terminal, and a first inversion reset terminal,
wherein the second T-type flip-flop comprises a second count input terminal, a second output terminal, a second inverted output terminal, and a second inversion reset terminal,
wherein the first pulse signal is input to the first count input terminal and the second inverter circuit,
wherein the first receiving rectangular wave signal is output from the first output terminal and is input to the second count input terminal,
wherein the second signal processing circuit comprises a third T-type flip-flop and a fourth T-type flip-flop,
wherein the third T-type flip-flop comprises a third count input terminal, a third output terminal, a third inverted output terminal, and a third inversion reset terminal,
wherein the fourth T-type flip-flop comprises a fourth count input terminal, a fourth output terminal, a fourth inverted output terminal, and a fourth inversion reset terminal,
wherein the second pulse signal is input to the third count input terminal and the first inverter circuit, and
wherein the second receiving rectangular wave signal is output from the third output terminal and is input to the fourth count input terminal.

10. The semiconductor device according to claim 9, wherein the first integrated circuit and the second integrated circuit are stacked.

11. The semiconductor device according to claim 9, wherein the first integrated circuit and the second integrated circuit are adjacent to each other.

12. The semiconductor device according to claim 9, wherein the first integrated circuit further comprises a receiving circuit, and
wherein the second integrated circuit further comprises a transmitting circuit.

13. The semiconductor device according to claim 4, wherein the first integrated circuit and the second integrated circuit are stacked.

14. The semiconductor device according to claim 4, wherein the first integrated circuit and the second integrated circuit are adjacent to each other.

15. The semiconductor device according to claim 4, wherein the first integrated circuit further comprises a receiving circuit, and
wherein the second integrated circuit further comprises a transmitting circuit.

16. An electronic device comprising the semiconductor device according to claim 4.

17. A semiconductor device comprising:
a coil configured to generate an induced electromotive force by utilizing electromagnetic induction;
a first comparator connected to the coil;
a second comparator connected to the coil;
a first signal processing circuit comprising a first D-type flip-flop and a second D-type flip-flop connected to the first D-type flip-flop; and
a second signal processing circuit comprising a third D-type flip-flop and a fourth D-type flip-flop connected to the third D-type flip-flop,
wherein the first D-type flip-flop is further connected to the first comparator and the second comparator,
wherein the second D-type flip-flop is further connected to the second comparator,
wherein the third D-type flip-flop is further connected to the first comparator and the first comparator, and
wherein the fourth D-type flip-flop is further connected to the first comparator.

18. The semiconductor device according to claim 17,
wherein the first comparator comprising a first non-inversion input terminal and a first inversion input terminal,
wherein the second comparator comprising a second non-inversion input terminal and a second inversion input terminal,
wherein the first D-type flip-flop comprises a first clock terminal, a first output terminal, a first inverted output terminal, a first data input terminal, and a first reset terminal,
wherein the second D-type flip-flop comprises a second clock terminal, a second output terminal, a second inverted output terminal, a second data input terminal, and a second reset terminal,
wherein the third D-type flip-flop comprises a third clock terminal, a third output terminal, a third inverted output terminal, a third data input terminal, and a third reset terminal,
wherein the fourth D-type flip-flop comprises a fourth clock terminal, a fourth output terminal, a fourth inverted output terminal, a fourth data input terminal, and a fourth reset terminal,
wherein the coil is connected to the first non-inversion input terminal and the second inversion input terminal,
wherein the first comparator is connected to the first clock terminal, the third reset terminal, and the fourth reset terminal,
wherein the second comparator is connected to the third clock terminal, the first reset terminal, and the second reset terminal,
wherein the first data input terminal is connected to the first inverted output terminal and the second clock terminal,
wherein the second data input terminal is connected to the second inverted output terminal,
wherein the third data input terminal is connected to the third inverted output terminal and the fourth clock terminal, and
wherein the fourth data input terminal is connected to the fourth inverted output terminal.

19. The semiconductor device according to claim 17,
wherein the first D-type flip-flop is configured to output an output signal,
wherein the second D-type flip-flop is configured to output a first error signal,
wherein the third D-type flip-flop is configured to output an inverted signal of the output signal,
wherein the fourth D-type flip-flop is configured to output a second error signal,
wherein a first reference potential is supplied to the first comparator,
wherein a second reference potential is supplied to the second comparator, and
wherein the first reference potential is higher than the second reference potential.

20. An electronic device comprising the semiconductor device according to claim 17.

21. A semiconductor device comprising:
a coil configured to generate an induced electromotive force by utilizing electromagnetic induction;

a first comparator connected to the coil;
a second comparator connected to the coil;
a first signal processing circuit comprising a first T-type flip-flop and a second T-type flip-flop connected to the first T-type flip-flop; and
a second signal processing circuit comprising a third T-type flip-flop and a fourth T-type flip-flop connected to the third T-type flip-flop,
a first inverter circuit between the second comparator and the first signal processing circuit; and
a second inverter circuit between the first comparator and the second signal processing circuit,
wherein the first T-type flip-flop is further connected to the first comparator and the first inverter circuit,
wherein the second T-type flip-flop is further connected to the first inverter circuit,
wherein the third T-type flip-flop is further connected to the first comparator and the second inverter circuit, and
wherein the fourth T-type flip-flop is further connected to the second inverter circuit.

22. The semiconductor device according to claim 21,
wherein the first comparator comprising a first non-inversion input terminal and a first inversion input terminal,
wherein the second comparator comprising a second non-inversion input terminal and a second inversion input terminal,
wherein the first T-type flip-flop comprising a first count input terminal, a first output terminal, a first inverted output terminal, and a first inversion reset terminal,
wherein the second T-type flip-flop comprises a second count input terminal, a second output terminal, a second inverted output terminal, and a second inversion reset terminal,
wherein the third T-type flip-flop comprises a third count input terminal, a third output terminal, a third inverted output terminal, and a third inversion reset terminal,
wherein the fourth T-type flip-flop comprises a fourth count input terminal, a fourth output terminal, a fourth inverted output terminal, and a fourth inversion reset terminal,
wherein the coil is connected to the first non-inversion input terminal and the second inversion input terminal,
wherein the first comparator is connected to the first count input terminal, the second inverter circuit,
wherein the second comparator is connected to the third count input terminal, the second inverter circuit,
wherein the first inverter circuit is connected to the first inversion reset terminal and the second inversion reset terminal,
wherein the second inverter circuit is connected to the third inversion reset terminal and the fourth inversion reset terminal,
wherein the first output terminal is connected to the second count input terminal,
wherein the third output terminal is connected to the fourth count input terminal.

23. The semiconductor device according to claim 21,
wherein the first T-type flip-flop is configured to output an output signal,
wherein the second T-type flip-flop is configured to output a first error signal,
wherein the third T-type flip-flop is configured to output an inverted signal of the output signal,
wherein the fourth T-type flip-flop is configured to output a second error signal,
wherein a first reference potential is supplied to the first comparator,
wherein a second reference potential is supplied to the second comparator, and
wherein the first reference potential is higher than the second reference potential.

24. An electronic device comprising the semiconductor device according to claim 21.

* * * * *